(12) United States Patent
Brown et al.

(10) Patent No.: US 12,339,211 B2
(45) Date of Patent: Jun. 24, 2025

(54) DEVICE FOR OPTIMIZING FLUID SAMPLE VOLUME AND METHOD OF USING THE SAME

(71) Applicant: HONEYWELL INTERNATIONAL INC., Charlotte, NC (US)

(72) Inventors: Andy Walker Brown, Charlotte, NC (US); Andrey Shtylenko, Charlotte, NC (US); Vikram Bhat, Charlotte, NC (US); Ratna Dinakar Tumuluri, Charlotte, NC (US); Ethan Wang, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 180 days.

(21) Appl. No.: 17/812,572

(22) Filed: Jul. 14, 2022

(65) Prior Publication Data

US 2023/0030075 A1 Feb. 2, 2023

(30) Foreign Application Priority Data

Jul. 30, 2021 (IN) .............................. 202111034487

(51) Int. Cl.
*G01N 15/0227* (2024.01)
*G01N 1/22* (2006.01)
*G01N 15/00* (2024.01)

(52) U.S. Cl.
CPC ........... *G01N 15/0227* (2013.01); *G01N 1/22* (2013.01); *G01N 2001/2297* (2013.01); *G01N 2015/0046* (2013.01); *G01N 2015/0053* (2013.01)

(58) Field of Classification Search
CPC ................. G01N 1/22; G01N 15/0227; G01N 2015/0046; G01N 2015/0053; G01N 2001/2297
See application file for complete search history.

(56) References Cited

U.S. PATENT DOCUMENTS

| 2011/0060533 A1* | 3/2011 | Jorden ................... G01N 33/18 702/29 |
| 2016/0069786 A1* | 3/2016 | Berg ...................... G01N 21/51 356/442 |
| 2017/0102016 A1* | 4/2017 | Azpiroz ................ B01L 3/5027 |
| 2021/0223155 A1 | 7/2021 | Brown et al. |

OTHER PUBLICATIONS

The Hague, Extended European Search Report for EP Application No. 22182866.8 dated Dec. 2, 2022 (14 pages).

* cited by examiner

*Primary Examiner* — Thanh Luu
(74) *Attorney, Agent, or Firm* — Alston & Bird LLP

(57) ABSTRACT

A fluid sampling device, the device having a fluid composition sensor configured to receive a fluid sample and capture a plurality of particles from the fluid sample at a collection media, wherein the fluid composition sensor is further configured to generate particle data associated with the plurality of particles using a particle imaging operation, and a controller, the controller being configured to: determine an optimal sample volume associated with a sample collection operation based at least in part on a particle load condition defined by the plurality of particles captured at the collection media during the sample collection operation, and update one or more operational characteristics of the fluid composition sensor such that the sample collection operation is defined at least in part by the optimal sample volume.

18 Claims, 6 Drawing Sheets

DEVICE FOR OPTIMIZING FLUID SAMPLE VOLUME AND METHOD OF USING THE SAME

CROSS-REFERENCE TO RELATED APPLICATIONS

This application claims priority pursuant to 35 U.S.C. 119(a) to India Patent Application No. 202111034487, filed Jul. 30, 2021, which application is incorporated herein by reference in its entirety.

TECHNOLOGICAL FIELD

An example embodiment relates generally to devices used to sample a volume of fluid from within the air of an ambient environment, including characterizing the particle content within the volume of fluid.

BACKGROUND

Sensors and devices may be utilized to characterize various aspects of fluids in a wide variety of applications. As just one example, sensor devices may be utilized for monitoring air conditions, such as monitoring and characterizing the particulate content of a flow of air. However, existing fluid sensor devices provide limited functionality in generating data indicative of certain characteristics of fluids, such as the unique identity and concentration of individual particles contained within a fluid flow. Fluid sensor devices can use holographic imaging methods to characterize particle identity and concentration of particulate matter that has been collected via inertial impaction. It is desirable to improve various aspects of particle sampling and analysis. In general, it can be advantageous for a fluid sampling device to utilize a sampling media that enables rapid and/or simplified sequential sampling of particles. For devices utilizing holographic imaging (such as lensless holography) for in situ particle analysis, it is desirable to avoid under-populated and/or incomplete particle samples, or over-saturation of a collection media defined by crowding within a collection media in order to avoid data distortion and achieve optimal particle data quality.

Accordingly, a need exists for an improved fluid sensor devices capable of reducing optical interference from the inertial impactor sampling method by optimizing the volume of fluid sampled to account for the particular characteristics of the fluid being sampled and/or enabling multiple samples to be analyzed from one or more impactor collection media.

BRIEF SUMMARY

Various embodiments described herein relate to apparatuses and methods for collecting and characterizing particles within a sample fluid. Various embodiments are directed to a fluid sampling device, the device comprising: a fluid composition sensor configured to receive a fluid sample and capture a plurality of particles from the fluid sample at a collection media, wherein the fluid composition sensor is further configured to generate particle data associated with the plurality of particles using a particle imaging operation; and a controller, the controller being configured to: determine an optimal sample volume associated with a sample collection operation based at least in part on a particle load condition defined by the plurality of particles captured at the collection media during the sample collection operation; and update one or more operational characteristics of the fluid composition sensor such that the sample collection operation is defined at least in part by the optimal sample volume.

In various embodiments, the controller may be further configured to determine an updated sampling duration corresponding to the optimal sample volume; wherein updating the one or more operational characteristics of the fluid composition sensor such that the sample collection operation is defined at least in part by the optimal sample volume includes updating the one or more operational characteristics of the fluid composition sensor such that the sample collection operation is defined at least in part by the updated sampling duration. In certain embodiments, the optimal sample duration may be determined based at least in part on an elapsed sample time as measured between a starting instance of the sample collection operation and an intermediate instance during the sample collection operation at which the particle data is generated by the fluid composition sensor. In various embodiments, the particle data generated by the fluid composition sensor may comprise a first particle image captured by an imaging device of the fluid composition sensor using lensless holography. In various embodiments, the particle load characteristic may comprise a particle coverage value defined by the plurality of particles captured at the collection media.

In various embodiments, the controller may be further configured to transmit the particle data to an external device, and receive particle load data associated with the plurality of particles from the external device, wherein the particle load data received is defined at least in part by the particle load condition. In various embodiments, the controller may be further configured to, upon determining that the optimal sample volume is at least substantially equal to a total sampled volume received by the fluid composition sensor, cause the fluid composition sensor to stop the sample collection operation. In various embodiments, the fluid composition sensor may be configured to capture a plurality of particle data at each of a plurality of instances defined by set time intervals during the sample collection operation.

In various embodiments, the particle data generated by the fluid composition sensor may comprise first particle data generated at a first instance during the sample collection operation and second particle data generated at a second instance during the sample collection operation, wherein the second instance is subsequent to the first instance; and wherein the controller is further configured to: determine a first optimal sample volume based at least in part on a first particle load condition defined by the plurality of particles captured at the collection media at the first instance; and determine a second optimal sample volume based at least in part on a second particle load condition defined by the plurality of particles captured at the collection media at the second instance. In certain embodiments, the controller may be further configured to: upon determining the second optimal sample volume, further update the one or more operational characteristics of the fluid composition sensor such that the sample collection operation is defined at least in part by the second optimal sample volume. In various embodiments, the optimal sample volume may be determined based at least in part on an elapsed sample time and a flow rate of the fluid composition sensor.

Various embodiments are directed to a fluid sampling device, the device comprising: a fluid composition sensor configured to receive a fluid sample and capture a plurality of particles from the fluid sample at a collection media, wherein the fluid composition sensor is further configured to generate particle data associated with the plurality of particles using a particle imaging operation; and a controller, the controller being configured to: determine an optimal sample duration associated with a sample collection operation based at least in part on a particle load condition defined by the plurality of particles captured at the collection media during the sample collection operation; and update one or more operational characteristics of the fluid composition sensor such that the sample collection operation is defined at least in part by the optimal sample duration.

Various embodiments are directed to a method for optimizing a sample collection operation comprising: receiving, via a volume of fluid, a fluid sample comprising a plurality of particles; capturing, at a first instance during the sample collection operation, first particle data associated with the first plurality of particles received from within the fluid sample; determining an optimal sample characteristic associated with the sample collection operation based at least in part on a first particle load condition defined by the first plurality of particles; and based at least in part on the optimal sample volume, updating one or more operational characteristics associated with the sample collection operation such that the sample collection operation is defined at least in part by the optimal sample characteristic.

In various embodiments, the optimal sample characteristic may comprise an optimal sample volume. In various embodiments, the optimal sample characteristic may comprise an optimal sample duration. In various embodiments, the fluid sample may be received by a fluid composition sensor at a collection media; and wherein the first particle data is generated by the fluid composition sensor. In certain embodiments, the first particle data generated by the fluid composition sensor may comprise a first particle image captured by an imaging device of the fluid composition sensor using lensless holography. In various embodiments, the method may further comprise upon determining that an optimal sample characteristic is at least substantially equal to a corresponding operational characteristic associated with the sample collection operation as measured at the first instance, stopping the sample collection operation.

In various embodiments, the method may further comprise capturing, at a second instance during the sample collection operation, second particle data associated with the plurality of particles received from within the fluid sample, wherein the second instance is subsequent to the first instance; and determining a second optimal sample characteristic based at least in part on a second particle load condition identified based at least in part on the second particle data. In various embodiments, the first particle load characteristic may comprise a particle coverage value defined at least in part by the first plurality of particles.

BRIEF DESCRIPTION OF THE DRAWINGS

Reference will now be made to the accompanying drawings, which are not necessarily drawn to scale, and wherein.

DETAILED DESCRIPTION

Figure 1:
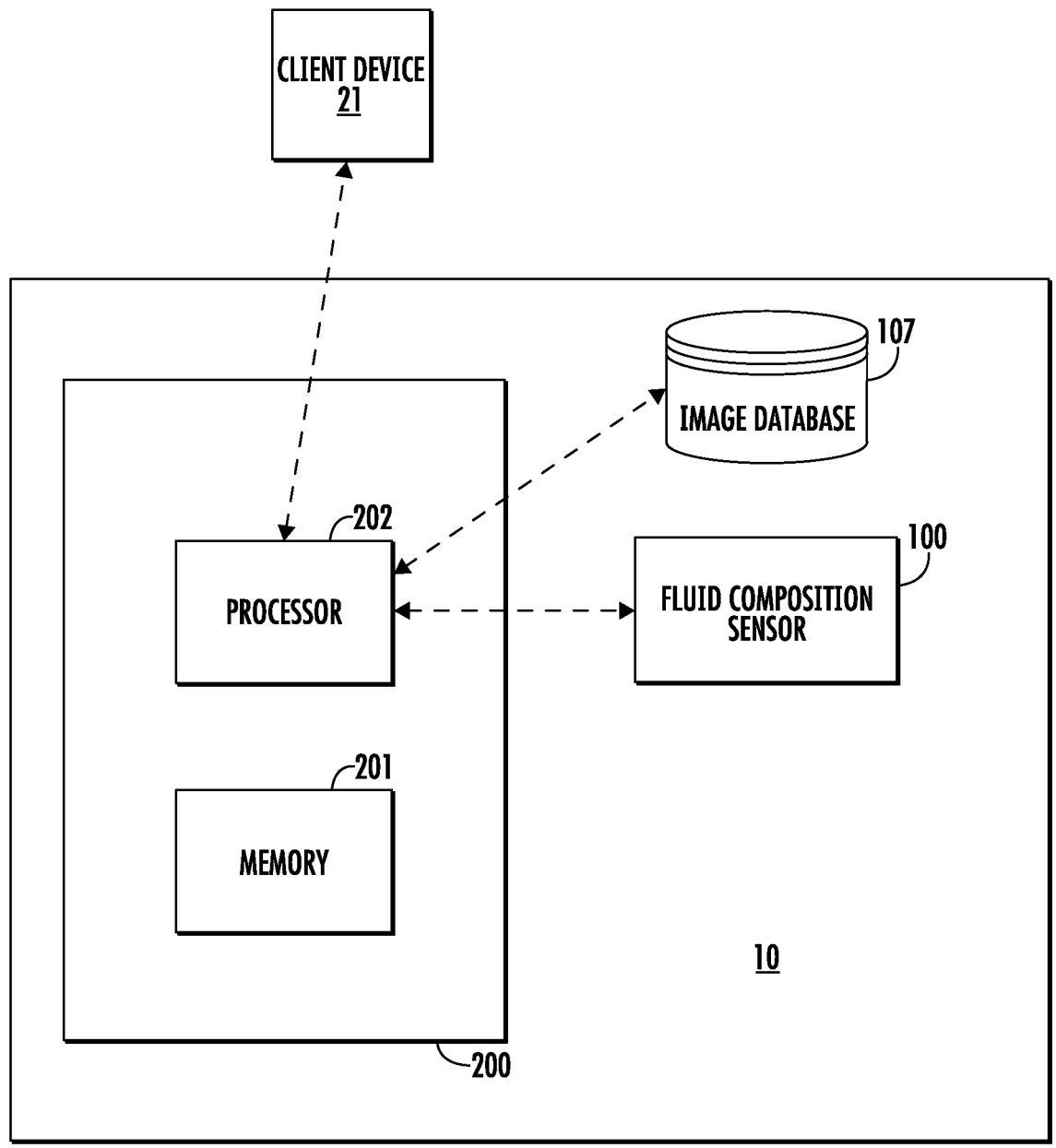
FIG. 1 is a schematic diagram of a fluid sensing system in accordance with an example embodiment of the present disclosure.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations. As used herein, a "fluid" may be embodied as a gas, a liquid, or a combination of a gas and a liquid in a single flow. Thus, the term "fluid" encompasses various materials subject to flow, such as, but not limited to, liquids and/or gases (e.g., air, oil, or the like). Thus, various embodiments are directed to fluid sensing systems, such as gas sensing systems (e.g., certain embodiments being specifically configured for operation with air; other embodiments being configured for operation with other gases, such as inert gases, volatile gases, and/or the like), liquid sensing systems, and/or the like.

Described herein is a device configured to characterize and monitor particulate matter within a volume of fluid. The device discussed herein may be configured to quantify and classify the particles within a volume of fluid based at least in part on the imaging of particles received by a collection media of a fluid composition sensor. Further, the device discussed herein may be configured to characterize the particle composition within the volume of fluid by directly identifying the particle size and particle type of each of the particles received by the collection media of the fluid composition sensor. By directly determining the particle size and particle type, the device as described herein may be configured to detect a change in particle composition within a volume of fluid over time and/or location.

Further, the device described herein may be configured to capture particle data, such as, for example, by capturing an image, by an imaging device of the fluid composition sensor. The device herein may comprise an impactor nozzle configured to minimize the reflection of a portion of a light beam emitted from an illumination source. The device herein may comprise an impactor nozzle configured to minimize imaging distortion caused by a divergent light beam emitted from an illumination source being incident on a sidewall thereof and reflecting toward the imager. For example, by minimizing the scattering of the light beam caused by the impactor nozzle, such a device configuration may reduce noise that may degrade the ability of the fluid composition sensor to locate, identify, and/or analyze individual particles of the one or more particles disposed within the collection media. The device may similarly be configured so as to avoid the degradation of an ability of the fluid composition sensor to reconstruct an image of one or more of the captured particles, which may result in decreased sensor performance with respect to classifying the one or more particles using machine learning.

Further, the device herein may be configured to increase device reliability and user satisfaction associated with the device by utilizing a replaceable collection media in conjunction with a fluid composition sensor. In accordance with certain embodiments discussed herein, the collection media used to collect particles from a volume of fluid within the fluid composition sensor may be automatically replaced (within a fluid collection position) upon a determination that a predefined sample volume of fluid or sample number of particles has passed through the device. The device herein may minimize intermittent user-interaction with the collection media, thereby expediting a sample collection process, reducing the physical work required of a user, facilitating measurement automation, and minimizing device failures caused by misalignment during a user-defined reconfiguration of one or more device components.

In various embodiments, a fluid composition sensor comprising a controller (e.g., sensor sampling optimization circuitry 209) configured to determine a particle load condition defined by a plurality of particles received from within a volume of fluid by a collection media characterize the spatial arrangement of the plurality of particles so as to identify one or more particle configurations known to negatively affect sensor accuracy and/or sensor effectiveness over time (e.g., lifespan), such as, for example, particle clustering, spiking, particle touching, particles on top of each other, and/or a collection media "covered" by particles, may facilitate the prevention of sensor inaccuracies caused by overloading an exhausted and/or compromised collection media with a particle load condition that cannot accurately be determined and/or identified by the sensor. Such an exemplary configuration substantially minimizes the amount of retesting required to obtain accurate data and prevents over-use of the fluid composition sensor by defining operational parameters configured to substantially autonomously limit the operation of the sensor upon identifying the presence of one or more of the aforementioned error-inducing particle load conditions. By dynamically monitoring the load condition of the plurality of particles received by the collection media and optimizing the operational parameters so as to selectively limit the run time of the device, the longevity of the device may be increased. Further, the device as described herein may further simplify the calculation of the requisite operational run time of the fluid composition sensor needed to a sample of particles sufficient to provide one or more statistically significant measurements.

In various embodiments, an exemplary fluid sampling device may determine an optimal sample volume associated with a sample collection operation based at least in part on a particle load condition defined by the plurality of particles captured at the collection media during the sample collection operation. In various embodiments, the present invention may be configured to update one or more operational characteristics of the fluid composition sensor such that the sample collection operation is defined at least in part by the optimal sample volume. Further, in various embodiments, an exemplary fluid sampling device may determine an optimal sample duration associated with a sample collection operation based at least in part on a particle load condition defined by the plurality of particles captured at the collection media during the sample collection operation. Further, in various embodiments, the present invention may be configured to update one or more operational characteristics of the fluid composition sensor such that the sample collection operation is defined at least in part by the optimal sample duration. In various embodiments, the present invention may include a fluid sampling device configured to facilitate a dynamic determination of an optimal sample duration for a particular sample collection operation that is made in real time based at least in part on particle data iteratively captured by a fluid composition sensor executing at least a portion of the sample collection operation.

Referring now to FIG. 1, a schematic diagram of an exemplary fluid sampling device 10 configured for fluid sensing is provided. The fluid sampling device 10 may include, be associated with, or may otherwise be in communication with a controller 200, including, for example, one or more processors 202 and one or more memory devices 201, and a fluid composition sensor 100. Further, in various embodiments, an exemplary fluid sampling device 10 may include, be associated with, or may otherwise be in communication with an image database 107. In various embodiments, the fluid sampling device 10 may be embodied by or associated with a plurality of computing devices that are in communication with or otherwise networked with one another. For example, a fluid composition sensor 100 may have a processor in communication with a controller 200, an image database 107, and/or one or more client devices 21. In various embodiments, some or all of the referenced components may be embodied as a fluid sampling device. For example, an exemplary fluid sampling device 10 may include a controller 200, including a processor 202 and a memory 201, a fluid composition sensor 100, and, optionally, an imaging database 107, one or more of which may be configured for communication with the client device 21, as described in further detail herein. In various embodiments, at least a portion of a fluid sampling device 10, such as, for example, an exemplary fluid composition sensor 100 (e.g., a controller 200), may be configured to communicate with a client device 21 executing a mobile application. In various embodiments, a client device may include, without limitation, smart phones, tablet computers, laptop computers, wearables (e.g., a smart watch), personal computers, and/or the like. A client device may execute an "app" to interact with one or more components of the fluid sampling device 10.

In various embodiments, the fluid composition sensor 100 of an exemplary fluid sampling device 10 may comprise a sensor configured for sampling a fluid sample defined by a volume of fluid, and/or monitoring particle composition of a plurality of particles within the fluid sample, such as, for example, by measuring and/or characterizing a product load condition (e.g., particle coverage value, and/or the like) defined by the plurality of particles.

Figure 2:
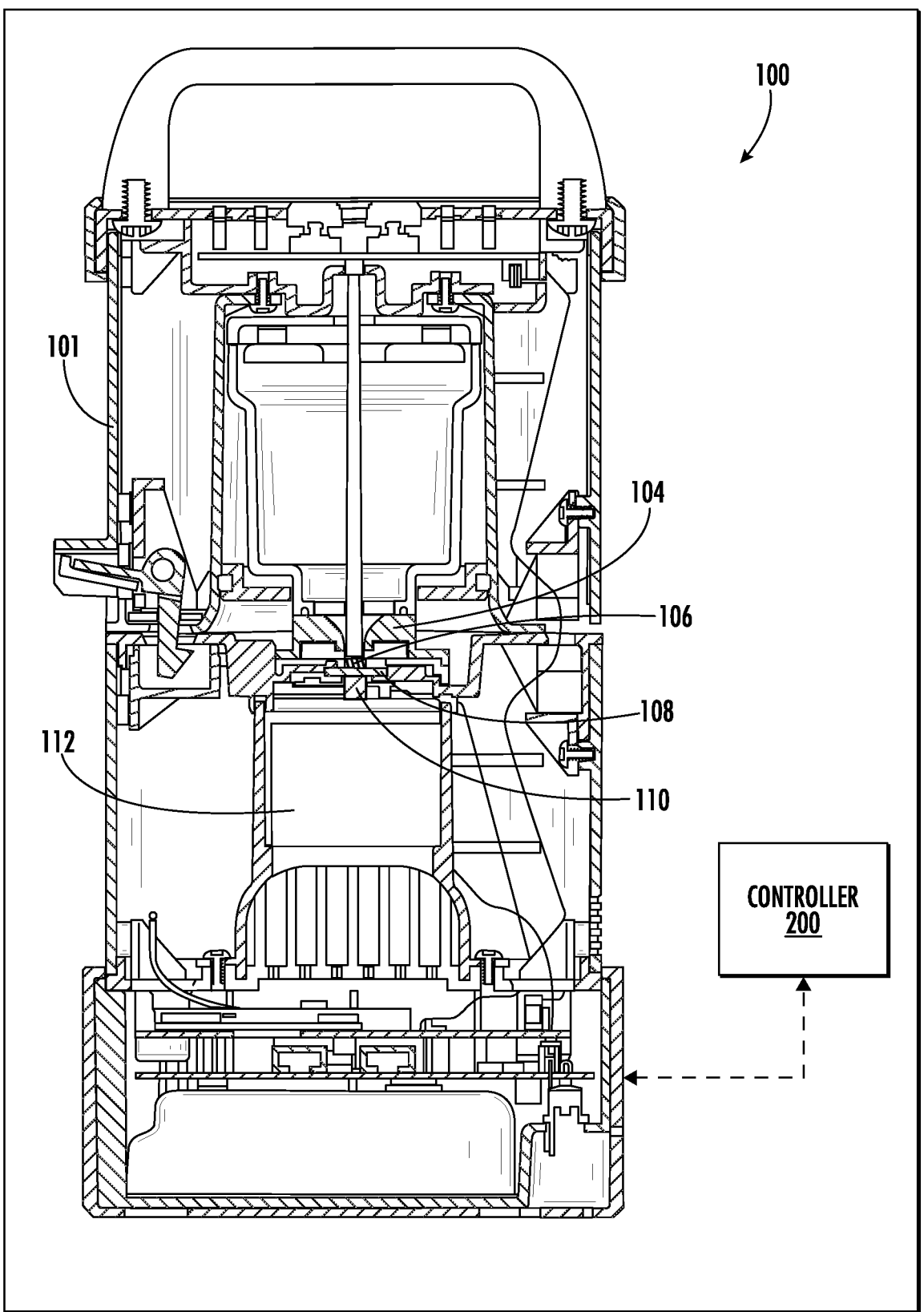
FIG. 2 illustrates a cross-sectional view of an exemplary apparatus in accordance with one embodiment described herein.

In various embodiments, an exemplary fluid composition sensor may be configured to execute a sample collection operation, wherein the fluid composition sensor receives a volume of fluid defining a first fluid sample. As described herein, the first fluid sample may comprise a plurality of particles disposed within the first fluid sample, such that the fluid composition sensor receives the plurality of particles via the first fluid sample. For example, referring to FIG. 2, an exemplary fluid sample (e.g., a first fluid sample comprising a first plurality of particles) may be received by a fluid sampling device 10 at a fluid composition sensor 100. FIG. 2 illustrates an exemplary fluid composition sensor 100 that may execute one or more fluid sample collection operations, wherein the fluid composition sensor 100 receives one or more fluid samples so as to capture a plurality of particles at a collection media over a period of time extending between a first instance (e.g., a starting instance) and a second instance (e.g., an ending instance). For example, the period of time between the first instance (e.g., the starting instance) and the second instance (e.g., the ending instance) of a fluid sample collection operation may define a sample duration. As described in further detail herein, in various embodiments, an exemplary fluid sampling device 10 (e.g., a fluid composition sensor 100) may be configured to determine an optimal sample duration for a particular fluid sample collection operation, such that the fluid sampling device 10 may determine a sample duration (e.g., an amount of fluid composition sensor operational runtime) that would result an optimal particle load condition being present within the collection media of the fluid composition sensor 100 based at least in part on particle data captured by the fluid composition sensor 100.

As illustrated, an exemplary fluid composition sensor 100 may comprise a particle imaging sensor. For example, an exemplary fluid composition sensor 100 may generate (e.g., capture) particle data associated with at least one of a plurality of particles received by the fluid sampling device 10 (e.g., the fluid composition sensor 100). In such an exemplary circumstance, exemplary fluid composition sensor 100 may capture particle data, such as, for example, a particle image, as described herein, of the plurality of particles received by the fluid composition sensor 100. Further, in various embodiments wherein a fluid composition sensor 100 is configured to receive a plurality of fluid samples, each having a respective plurality of particles therein, the particle data captured by a fluid composition sensor 100 may comprise first particle data associated specifically with a first plurality of particles received by the fluid composition sensor 100 via a first fluid sample, such as, for example, a first particle image capturing at least a portion of the first plurality of particles. Further, in various embodiments, first particle data captured by a fluid composition sensor 100 may further comprise first particle data generated by the fluid composition sensor 100 based at least in part on the captured particle data (e.g., particle image), such as, for example, particle type data, particle matter mass concentration data, particle quantity data, particle size data, particle density data, particle coverage value data, and/or the like.

As illustrated, in various non-limiting exemplary embodiments, an exemplary fluid composition sensor 100 may comprise a housing 101, an impactor nozzle 104, a collection media 106, an at least partially transparent substrate 108, and an imaging device 110. In some embodiments, the fluid composition sensor 100 may further comprise a power supply 114 configured to power the fluid composition sensor 100 and a fan or pump 112 configured to pull the volume of fluid into and through the fluid composition sensor 100. In various embodiments, the fan or pump 112 is calibrated, such that the flow rate of fluid moving through the device is known/determined based at least in part on the operating characteristics (e.g., operating power) of the fan or pump 112. In various embodiments, a fluid composition sensor 100 comprising a collection media 106 may be configured so as to direct at least a portion of a fluid sample received by the fluid composition sensor 100 along a fluid flow path within the sensor housing 101 in a direction perpendicular to a receiving surface of the collection media 106, such that the fluid sample (e.g., a first fluid sample comprising a first plurality of particles) may interact with the collection media 106. As a non-limiting example, in various embodiments, the collection media 106 may comprise an adhesive (i.e. sticky) material, such as a gel, and may be configured to receive at least a portion of the plurality of particles via the interaction with the fluid sample. For example, in various embodiments, the collection media 106 may be disposed upon at least a portion of a transparent substrate 108.

As described herein, in various embodiments, the fluid composition sensor 100 may be configured to generate (e.g., capture) particle data associated with a plurality of particles disposed within the collection media 106 using an imaging device 110. For example, in various embodiments, the fluid composition sensor 100 may comprise an imaging device 110 configured to capture particle data comprising an image of the plurality of particles received by the collection media 106. In various embodiments, the imaging device 110 may be positioned at least substantially adjacent (e.g., in contact with or spaced a distance away from) the backside 107 of the transparent substrate 108 such that the imaging device 110 may effectively capture one or more images of the one or particles captured within the collection media 106. In various embodiments, an exemplary fluid composition sensor 100 may have a designated field of view for capturing, permanently and/or temporarily, a particle image of at least a portion of a plurality of particles simultaneously. For example, the collection media 106 may reside at least partially within the field of view of an imaging device 110, as described herein, such that the at least a portion of the first plurality of particles captured by the collection media 106 is visible by the imaging device 110, and first particle data comprising a particle image may be captured by the fluid composition sensor 100 (e.g., by the imaging device 110).

In various embodiments, an imaging device 110 may be configured to capture particle data comprising an image of one or more particles of the plurality of particles received by the collection media 106 using one or more imaging techniques such as, for example, lensless holography. In various embodiments wherein the imaging device is configured to utilize lensless holography, the imaging device may computationally produce an image of the one or more particles received by the collection media 106 by digitally reconstructing one or more microscopic images of one or more particles received by the collection media 106 without using a lens. Alternatively, or additionally, in various embodiments, a fluid composition sensor may comprise a lens-based imaging device or any other device configured to capture a particle image that may at least partially define the particle data, as described herein. In various embodiments, a lens-based imaging device may utilize one or more imaging techniques, such as, for example, optical microscopy, to capture a particle image of the plurality of particles captured at a collection media. In various embodiments, optical microscopy may comprise light transmitted through or reflected from a collection media and/or a plurality of particles disposed therein through one or more lenses to magnify and capture a particle image of at least a portion of a plurality of particles within the collection media. For example, in various embodiments, as described herein, an image captured by an exemplary imaging device, such as, for example, imaging device 110, may comprise a two-dimensional image (e.g., a photograph of at least a portion of the collection media) and/or a three-dimensional image (e.g., a three-dimensional digital reconstruction of at least a portion of the particles captured at the collection media 106).

In some embodiments, the fluid composition sensor 100 may be configured to capture a plurality of particle data (e.g., one or more images) associated with a plurality of particles in the collection media 106 at least substantially simultaneously. Additionally, or alternatively, in various embodiments, the imaging device 110 may be configured to capture a plurality of particle data at a plurality of sequential instances throughout a sample duration comprising the period of time over which a sample collection operation is executed by a fluid composition sensor 100. For example, fluid composition sensor 100 may utilize imaging device 110 to capture first particle data comprising a first particle image at a first time and second particle data comprising a second particle image at a second time, wherein the second time is subsequent the first time. In such an exemplary circumstance, the first particle image may capture a first plurality of particles received by the fluid composition sensor 100 via a first fluid sample, and the second particle image may capture both a second plurality of particles received by the fluid composition sensor 100 via a second fluid sample and the previously received first plurality of particles. As a non-limiting example, in various embodiments, an exemplary device 10 comprising a fluid composition sensor 100 may be able to distinguish between particles present within the collection media 106 at the second time and particles that were newly received by the collection media 106 by comparing the respective particle data (e.g., images) captured at the first and second times and identifying any particles from the second captured particle data that were not captured in the first captured particle data.

In various embodiments, as described in further detail herein, an exemplary fluid composition sensor 100 may be configured to transmit captured particle data (e.g., first particle data) and/or one or more signals (e.g., data signals, control signals) to one or more components of the exemplary fluid sampling device 10 associated therewith, such as, for example, a controller 200. It should be understood that the exemplary configuration of the fluid composition sensor 100 illustrated in FIG. 2 is merely an example, and various embodiments, a fluid sampling device, as described herein, may incorporate fluid composition sensors having other configurations for detection of one or more particle characteristics.

As described herein, an exemplary fluid sampling device 10 may be configured to execute both a particle collection functionality and a particle analysis functionality. For example, an exemplary fluid sampling device 10 may be configured to execute an a particle collection functionality using a fluid composition sensor 100, and may be may be configured to execute an a particle analysis functionality using one or both of a fluid composition sensor 100 and/or a controller 200. As described herein, the particle collection functionality of the fluid sampling device 10 (e.g., the fluid composition sensor 100) may correspond to a fluid composition sensor 100 receiving a volume of fluid including a fluid sample comprising a plurality of particles and utilizing an impactor nozzle 104 to direct the volume of fluid toward a receiving surface of a collection media 106 in a flow direction at least substantially perpendicular to the collection media 106, so as to facilitate the engagement of the collection media 106 by the volume of fluid such that at least a portion of the plurality of particles within the volume of fluid may be disposed into the collection media 106. Further, as described herein, the particle analysis functionality of the fluid sampling device 10 may correspond to the fluid composition sensor 100 capturing particle data such as, for example, an image of the one or more particles received by the collection media 106, the fluid composition sensor 100, a controller 200, and/or an external device in communication therewith determining, based at least in part on the image, at least one particle load condition (e.g., at least one particle characteristic) of the fluid sample received by the fluid composition sensor. Further, in various embodiments, the particle analysis functionality of the fluid sampling device 10 may include the fluid composition sensor 100 and/or a controller 200 determining an optimal sample volume and/or an optimal sample duration for a sample collection operation being executed by the fluid composition sensor 100, as described herein. For example, the particle analysis functionality of the fluid sampling device 10 may include a dynamic determination of an optimal sample duration for a particular sample collection operation made by the fluid sampling device 10 in real time based at least in part on particle data iteratively captured by the fluid composition sensor 100 during the sample collection operation.

As described herein, in various embodiments, the particle collection functionality and the particle analysis functionality of the fluid sampling device 10 may occur at least partially in sequence. Further, in various embodiments, the particle collection functionality and the particle analysis functionality of the fluid sampling device 10 may at least partially overlap one another. For example, in various embodiments, as described herein, the fluid sampling device 10 may execute at least a portion of a particle analysis functionality (e.g., one or more particle analysis operations) prior to the particle collection functionality being completed in full, such that at least a portion of a particle analysis functionality is executed during the duration of one or more fluid sample collection operations. In various embodiments, a fluid sampling device 10 may comprise a controller 200, described in further detail herein, configured to generate and/or transmit one or more signals in order to facilitate a determination of an optimal sample characteristic for a sample collection operation based at least in part on particle data captured by the fluid composition sensor 100. In various embodiments, an optimal sample characteristic associated with a sample collection operation may comprise one or more operational characteristics of a fluid composition sensor 100 executing the sample collection operation. For example, the fluid sampling device 10 may determine that executing a sample collection operation that is defined at least in part by an optimal sample characteristic, such as, for example, an optimal sample volume and/or an optimal sample duration, that, upon completion of the sample collection operation, will result in a plurality of particles being received by the fluid composition sensor (e.g., by a collection media) that is defined a particle load condition that is at least substantially similar to a predetermined optimal particle load condition.

As a non-limiting example, in various embodiments, the controller 200, of an exemplary fluid sampling device 10 may be configured to generate and/or transmit one or more signals configured to cause a fluid composition sensor 100 executing a sample collection operation to update, modify, and/or otherwise adjust an initial sample duration, defined as a first duration, such as, for example, an initial, baseline, and/or default period of time that the fluid composition sensor 100 is operatively configured to maintain the sample collection operation. The controller 200 may cause the fluid composition sensor 100 to update, modify, and/or otherwise adjust the initial sample duration such that the fluid composition sensor 100 receives updated instructions to continue executing the sample collection operation until the sample duration associated therewith is at least substantially equal to the updated optimal sample duration. As described herein, an updated optimal sample duration may be determined based at least in part on a particle load condition defined by a plurality of particles within the collection media 106 of the fluid composition sensor 100 at a particular time. As a non-limiting example, in various embodiments, a fluid sampling device 10 may determine an updated optimal sample duration based at least in part on a particle load condition that is a particle coverage value defined by the plurality of captured particles. For example, a fluid sampling device 10 may determine the updated optimal sample duration based on a comparison of the particle coverage value exhibited by the plurality of particles captured in a particle image to a stored optimal particle load condition (e.g., a stored optimal particle coverage value).

Further, in various embodiments, a controller 200 of an exemplary fluid sampling device 10 may be configured to generate and/or transmit one or more signals configured to cause the fluid composition sensor 100 to terminate a sample collection operation, such as by stopping operation of a pump 112 of the sensor 100 (e.g., by causing the pump 112 to adjust from an "ON" operational configuration to an "OFF" configuration) based at least in part on a determination that an updated optimal sample duration is at least substantially equal to an elapsed amount of time since the sample collection operation was initiated (e.g., the sample duration of the sample collection operation). Additionally, or alternatively, the controller 200 may be configured to generate and/or transmit one or more signals configured to cause the fluid composition sensor 100 to terminate a sample collection operation by, for example, by stopping operation of a pump 112 of the sensor 100 based on a determination that the sample duration of the sample collection operation has reached (e.g., is at least substantially equal to and/or greater than) a predefined maximum sample collection operation duration threshold. In such an exemplary circumstance, the controller 200 may be configured to cause the fluid composition sensor 100 to stop the sample collection operation even if the particle load condition at the collection media of the fluid composition sensor is not at least substantially similar to a predetermined optimal particle load condition, so as to, for example, avoid a circumstance wherein the sample collection operation continues for an indefinite amount of time.

As shown in FIGS. 1-3B, a fluid sampling device 10 may comprise a controller 200 configured to determine an optimal sample characteristic, such as, for example, an optimal sample volume, associated with a sample collection operation based at least in part on a particle load condition defined by the plurality of particles captured at the collection media during the sample collection operation, and update one or more operational characteristics of the fluid composition sensor such that the sample collection operation is defined at least in part by the optimal sample volume. As illustrated in FIG. 3A, the controller 200 may comprise a memory 201, a processor 202, input/output circuitry 203, communication circuitry 205, an imaging device data repository 107, a collection media characteristic database 204, particle imaging circuitry 206, particle type identification circuitry 207, particle matter mass concentration calculation circuitry 208, and sensor sampling optimization circuitry 209. The controller 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the controller 200 should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the controller 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. For example, the memory 201 may be an electronic storage device (e.g., a computer readable storage medium). In various embodiments, the memory 201 may be configured to store information, data, content, applications, instructions, or the like, for enabling the apparatus to carry out various functions in accordance with example embodiments of the present disclosure. It will be understood that the memory 201 may be configured to store partially or wholly any electronic information, data, data structures, embodiments, examples, figures, processes, operations, techniques, algorithms, instructions, systems, apparatuses, methods, look-up tables, or computer program products described herein, or any combination thereof. As a non-limiting example, the memory 201 may be configured to store particle size data, particle type data, particle impaction depth data, particle image data, particle shape data, particle cross-sectional area data, particle mass data, particle density data, and particulate matter mass concentration data associated with a volume of fluid. In various embodiments, the memory may be further configured to store one or more particle impaction depth-momentum look-up tables. Further, in various embodiments, memory 201 may be configured to store one or more operational characteristics associated with a sample collection operation, such as, for example, an optimal sample duration, an optimal sample volume, one or more total sample volumes collected by a fluid composition sensor during a sample collection operation as measured at one or more instances, a sample duration, one or more elapsed times defined by an amount of time elapsed since the start of a sample collection operation as measured at one or more instances, and/or the like. As described herein, the memory 201 may be configured such that one or more of the operational characteristics associated with a sample collection operation may be dynamically updated at one or more instances during the sample collection operation in response to an identified particle load condition.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the controller 200 may include input-output circuitry 203 that may, in turn, be in communication with the processor 202 to provide output to the user and, in some embodiments, to receive input such as a command provided by the user. The input-output circuitry 203 may comprise a user interface, such as a graphical user interface (GUI), and may include a display that may include a web user interface, a GUI application, a mobile application, a client device, or any other suitable hardware or software. In some embodiments, the input-output circuitry 203 may also include a display device, a display screen, user input elements, such as a touch screen, touch areas, soft keys, a keyboard, a mouse, a microphone, a speaker (e.g., a buzzer), a light emitting device (e.g., a red light emitting diode (LED), a green LED, a blue LED, a white LED, an infrared (IR) LED, or a combination thereof), or other input-output mechanisms. The processor 202, input-output circuitry 203 (which may utilize the processing circuitry), or both may be configured to control one or more functions of one or more user interface elements through computer-executable program code instructions (e.g., software, firmware) stored in a non-transitory computer-readable storage medium (e.g., memory 201). Input-output circuitry 203 is optional and, in some embodiments, the controller 200 may not include input-output circuitry. For example, where the controller 200 does not interact directly with the user, the controller 200 may generate user interface data for display by one or more other devices with which one or more users directly interact and transmit the generated user interface data to one or more of those devices. For example, the controller 200, using user interface circuitry may generate user interface data for display by one or more display devices and transmit the generated user interface data to those display devices.

The communications circuitry 205 may be a device or circuitry embodied in either hardware or a combination of hardware and software that is configured to receive and/or transmit data from/to a network and/or any other device, circuitry, or module in communication with the apparatus 200. For example, the communications circuitry 205 may be configured to communicate with one or more computing devices via wired (e.g., USB) or wireless (e.g., Bluetooth, Wi-Fi, cellular, and/or the like) communication protocols.

In various embodiments, the processor 202 may be configured to communicate with the particle imaging circuitry 206. The particle imaging circuitry 206 may be a device or circuitry embodied in either hardware or a combination of hardware and software that is configured to receive, process, generate, and/or transmit data, such as an image captured by the imaging device 110. Further, in various embodiments, the particle imaging circuitry 206 may be configured to analyze one or more images captured by the imaging device 110 of the fluid composition sensor 100 to determine which particles of the plurality of particles present within the collection media 106 were newly received by the collection media 106 during a recent particle analysis. The particle imaging circuitry 206 may receive from the imaging device a first captured particle image and a second captured particle image, captured at a first time and a second time, respectively, wherein the first time represents the start of an analysis of the one or more particles of the plurality of particles captured by the collection media 106 by the device 10 and the second time is subsequent the first time (occurs after the first time). In such a configuration, the device may be configured to distinguish between particles present within the collection media 106 at the start of the particle analysis and particles that were newly received by the collection media 106 by comparing the respective particle images captured at the first and second times and identifying any particles from the second captured particle image that were not captured in the first captured particle image.

In various embodiments, the particle imaging circuitry 206 may be further configured to analyze one or more images captured by the imaging device 110 of the fluid composition sensor 100 to determine the size of each of the one or more particles of the plurality of particles within the collection media 106. In various embodiments, the size of a particle may be defined by the cross-sectional area of the particle. In various embodiments, the particle imaging circuitry 206 may be configured to determine the particle size of particles with any of a variety of particle sizes. As an example, the particle imaging circuitry 206 may be configured to determine particle sizes of particles having a diameter of between about 0.3 and about 100 microns (e.g., 2.5 microns), and thus, a size category with which the particle may be associated, such as, for example, PM10, PM4, PM2.5, or PM1. In various embodiments, the controller and/or the particle imaging circuitry 206 may be further configured to analyze one or more images captured by the imaging device 110 of the fluid composition sensor 100 to determine the shape of each of the one or more particles of the plurality of particles within the collection media 106. In various embodiments, a particle shape may be defined at least in part by a particle cross-sectional area. The particle imaging circuitry 206 may be further configured to determine the particle impaction depth 121 of each of the one or more particles of the plurality of particles within the collection media 106 using one or more image focusing techniques. The particle imaging circuitry 206 may be configured to execute instructions stored, for example, in the memory 201 for carrying out the one or more image focusing techniques. In various embodiments, the one or more image focusing techniques may comprise one or computational techniques, such as, for example, Angular Spectrum Propagation (ASP). In other embodiments, opto-mechanical adjustment may be used as an image focusing technique. In various embodiments, the particle imaging circuitry 206 may use the one or more image focusing techniques to determine a depth of focus 122 for each of the one or more particles of the plurality of particles within the collection media. Upon determining a depth of focus for each of the one or more particles, the particle imaging circuitry 206 may be configured to calculate, using known dimensions of the fluid composition sensor 100 such as, for example, the collection media thickness and the distance between the transparent substrate 108 and the imaging device 110, the impaction depth 121 of each of the one or more particles of the plurality of particles within the collection media 106. In various embodiments, for example, the impaction depth 121 of a particle within the collection media 106 may be calculated by subtracting the measured depth of focus 122 of a particle from the sum of the collection media thickness, the transparent substrate thickness, and the distance between the transparent substrate 108 and the imaging device 110. The particle imaging circuitry 206 may send and/or receive data from the imaging device data repository 107. In various embodiments, the particle imaging circuitry 206 may be configured to determine an impaction depth of a particle using one or more machine learning techniques. In various embodiments, the one or more machine learning techniques used by the particle imaging circuitry 206 to determine the impaction depth of a particle may comprise using deep supervised learning with one or more labeled datasets of one or more known particle characteristics, such as, for example, particle type, particle velocity, particle size, particle shape, and/or any other data generated, transmitted, and/or received by the controller 200 to estimate the impaction depth of the particle.

In various embodiments, the processor 202 may be configured to communicate with the particle type identification circuitry 207. The particle type identification circuitry 207 may be a device or circuitry embodied in either hardware or a combination of hardware and software that is configured to identify a particle type and/or particle species of one or more particles of the plurality of particles received by the collection media 106. In various embodiments, a plurality of particles within a volume of fluid may comprise one or more particles of various particle types, such as, for example, one or more of bacteria, pollen, spores, molds, biological particles, soot, inorganic particles, and organic particles. In various embodiments, the particle type identification circuitry 207 may determine the particle type and/or particle species of each of the one or more particles of the plurality of particles received by the collection media 106 using one or more machine learning techniques. In various embodiments, the one or more machine learning techniques used by the particle type identification circuitry 207 to determine the particle type and/or species of each of the one or more particles of the plurality of particles may comprise analyzing an image captured by the imaging device 110, particle size data, particle shape data, particle load data and/or any other data generated, transmitted, and/or received by the controller 200. In various embodiments, the particle type identification circuitry 207 may send and/or receive data from the imaging device data repository 107. Further, in various embodiments, the particle type identification circuitry 207 may be configured to receive the determined particle initial velocity data corresponding to one or more of the particles of the plurality of particles 120 received by the collection media 106 from the particle matter mass concentration calculation circuitry 208. In various embodiments, the particle type identification circuitry 207 may be configured to compare the determined particle initial velocity for a particle to the particle velocity approximated based at least in part on a known flow rate of fluid moving through the fluid composition sensor 100 and generate velocity comparison data associated with the particle. In various embodiments, the particle type identification circuitry 207 may be configured execute a feedback loop, wherein one or more velocity comparison data associated with one or more particles of the plurality of particles received by the collection media 106 may define one or more inputs into a machine learning model in order to increase a rate of machine learning associated with the one or more machine learning techniques, as described herein.

In various embodiments, the device 10 may be configured with, or in communication with, a collection media characteristic database 204. The collection media characteristic database 204 may be stored, at least partially on the memory 201 of the system. In some embodiments, the collection media characteristic database 204 may be remote from, but in connection with, the device 10. The collection media characteristic database 204 may contain information, such as one or more particle impaction depth-momentum relationship look-up tables. In various embodiments, a particle impaction depth-momentum relationship look-up table may comprise a data matrix used to define a relationship between a particle impaction depth and a particle initial momentum (i.e. the momentum of a particle at a receiving surface 105 of the collection media 106, wherein the particle is received by the collection media 106 at the receiving surface 105, as described herein) for a particular collection media type. Various particle impaction depth-momentum relationship look-up tables may comprise data matrices used to define a relationship between a particle impaction depth and a particle initial momentum for various collection media types.

The particle matter mass concentration calculation circuitry 208 may be a device or circuitry embodied in either hardware or a combination of hardware and software that is configured to determine a particulate matter mass concentration within a volume of fluid. In various embodiments, the particle matter mass concentration calculation circuitry 208 may be configured to determine the particulate matter mass concentration within a volume of fluid based on an approximated collective mass of a plurality of particles present within the volume of fluid. In various embodiments, the particle matter mass concentration calculation circuitry 208 may be configured to determine the approximated collective mass of a plurality of particles present within the volume of fluid based on a collective mass of the plurality of particles 120 received by the collection media 106. In various embodiments, the particle matter mass concentration calculation circuitry 208 may be configured to determine a collective mass of the plurality of particles 120 received by the collection media 106 based on the respective estimated masses of each of the particles of the plurality of particles 120. In various embodiments, the particle matter mass concentration calculation circuitry 208 may be configured to estimate the respective masses of each of the particles of the plurality of particles 120 based at least in part on the respective determined impaction depths of each particle.

In various embodiments, the particle matter mass concentration calculation circuitry 208 may be configured to estimate the mass of a particle of the plurality of particles 120 by retrieving data corresponding to a particle such as, for example, particle size data, particle shape data (e.g., particle cross-sectional area data, particle orientation data), and particle impaction depth, and, based on data in a particle impaction depth-momentum look-up table that correlates particle impaction depth to particle initial momentum for a given collection media 106 type, determine the initial momentum of the particle prior to the particle being received by the collection media 106. Using a known relationship between momentum, velocity, and mass—the momentum of a particle is equal to the mass of the particle multiplied by the velocity of the particle—and the known velocity of the particle—a controlled value based on an air flow velocity within the device 10—the particle matter mass concentration calculation circuitry 208 may be configured to determine the estimated mass of the particle.

In various embodiments, the particle matter mass concentration calculation circuitry 208 may be configured to determine the estimated mass of the particle using one or more machine learning techniques. In various embodiments, the one or more machine learning techniques used by the particle matter mass concentration calculation circuitry 208 to determine the particle mass of a particle may comprise using deep supervised learning with one or more labeled datasets of one or more known particle characteristics, such as, for example, particle type, particle velocity, particle impaction depth, various particle gravimetric measurements, and/or any other data generated, transmitted, and/or received by the controller 200 to estimate the mass of the particle. In various embodiments, the particle matter mass concentration calculation circuitry 208 may be configured to apply one or more compensation factors to a determined particle mass using one or more machine learning techniques.

Further, in various embodiments, the particle matter mass concentration calculation circuitry 208 may be configured to determine the estimated density of the particle based at least in part on one or more of the particle impaction depth, the estimated particle mass, the particle shape, the particle type, and the particle size data. In various embodiments, the particle matter mass concentration calculation circuitry 208 may be configured to determine the estimated mass and/or density of each of the particles of the plurality of particles 120 received by the collection media 106. In various embodiments, the particle matter mass concentration calculation circuitry 208 may be configured to apply one or more compensation factors to the estimated mass of the particle to account for one or both of a particle condition associated with the particle and ambient conditions associated with the ambient environment. In various embodiments, for example, the particle matter mass concentration calculation circuitry 208 may be configured to apply an appropriate compensation factor based at least in part on the particle cross-sectional area, the ambient temperature, and/or the ambient humidity. In various embodiments, the particle matter mass concentration calculation circuitry 208 may be configured to determine the estimated collective mass of the plurality of particles 120 received by the collection media based on the estimated mass of each of the particles of the plurality of particles 120 received by the collection media 106. In various embodiments, the particle matter mass concentration calculation circuitry 208 may be configured to determine the approximate collective mass of a plurality of particles present within the volume of fluid based on a determined collective mass of the plurality of particles 120 received by the collection media 106. In various embodiments, the particle matter mass concentration calculation circuitry 208 may be configured to determine the particulate matter mass concentration within the volume of fluid based on the approximate collective mass of the plurality of particles present within the volume of fluid. In various embodiments, the particle matter mass concentration calculation circuitry 208 may be configured to apply one or more scale factors to the determined particulate matter mass concentration within the volume of fluid to account for experimental inefficiencies such as, for example, particle collection efficiencies and detection probability factors. In various embodiments, an appropriate scale factor may be determined based on empirical data.

Moreover, the particle matter mass concentration calculation circuitry 208 may be configured to determine that the collection media 106 needs to be replaced. For example, in various embodiments, the particle matter mass concentration calculation circuitry 208 may be configured to determine that a threshold amount of time has passed since the collection media 106 was last replaced, that the number of particles present within the collection media 106 has surpassed a predetermined threshold number of particles, and/or that a percentage of particle coverage within a field of view has surpassed threshold particle coverage value.

The particle matter mass concentration calculation circuitry 208 may be a device or circuitry embodied in either hardware or a combination of hardware and software that is configured to determine a particulate matter mass concentration within a volume of fluid. In various embodiments, the particle matter mass concentration calculation circuitry 208 may be configured to determine the particulate matter mass concentration within a volume of fluid based on an approximated collective mass of a plurality of particles present within the volume of fluid. In various embodiments, the particle matter mass concentration calculation circuitry 208 may be configured to determine the approximated collective mass of a plurality of particles present within the volume of fluid based on a collective mass of the plurality of particles 120 received by the collection media 106. In various embodiments, the particle matter mass concentration calculation circuitry 208 may be configured to determine a collective mass of the plurality of particles 120 received by the collection media 106 based on the respective estimated masses of each of the particles of the plurality of particles 120. In various embodiments, the particle matter mass concentration calculation circuitry 208 may be configured to estimate the respective masses of each of the particles of the plurality of particles 120 based at least in part on the respective determined impaction depths of each particle.

In various embodiments, the particle matter mass concentration calculation circuitry 208 may be configured to estimate the mass of a particle of the plurality of particles 120 by retrieving data corresponding to a particle such as, for example, particle size data, particle shape data (e.g., particle cross-sectional area data, particle orientation data), and particle impaction depth, and, based on data in a particle impaction depth-momentum look-up table that correlates particle impaction depth to particle initial momentum for a given collection media 106 type, determine the initial momentum of the particle prior to the particle being received by the collection media 106. Using a known relationship between momentum, velocity, and mass—the momentum of a particle is equal to the mass of the particle multiplied by the velocity of the particle—and the known velocity of the particle—a controlled value based on an air flow velocity within the device 10—the particle matter mass concentration calculation circuitry 208 may be configured to determine the estimated mass of the particle.

In various embodiments, the particle matter mass concentration calculation circuitry 208 may be configured to determine the estimated mass of the particle using one or more machine learning techniques. In various embodiments, the one or more machine learning techniques used by the particle matter mass concentration calculation circuitry 208 to determine the particle mass of a particle may comprise using deep supervised learning with one or more labeled datasets of one or more known particle characteristics, such as, for example, particle type, particle velocity, particle impaction depth, various particle gravimetric measurements, and/or any other data generated, transmitted, and/or received by the controller 200 to estimate the mass of the particle. In various embodiments, the particle matter mass concentration calculation circuitry 208 may be configured to apply one or more compensation factors to a determined particle mass using one or more machine learning techniques.

Further, in various embodiments, the particle matter mass concentration calculation circuitry 208 may be configured to determine the estimated density of the particle based at least in part on one or more of the particle impaction depth, the estimated particle mass, the particle shape, the particle type, and the particle size data. In various embodiments, the particle matter mass concentration calculation circuitry 208 may be configured to determine the estimated mass and/or density of each of the particles of the plurality of particles 120 received by the collection media 106. In various embodiments, the particle matter mass concentration calculation circuitry 208 may be configured to apply one or more compensation factors to the estimated mass of the particle to account for one or both of a particle condition associated with the particle and ambient conditions associated with the ambient environment. In various embodiments, for example, the particle matter mass concentration calculation circuitry 208 may be configured to apply an appropriate compensation factor based at least in part on the particle cross-sectional area, the ambient temperature, and/or the ambient humidity. In various embodiments, the particle matter mass concentration calculation circuitry 208 may be configured to determine the estimated collective mass of the plurality of particles 120 received by the collection media based on the estimated mass of each of the particles of the plurality of particles 120 received by the collection media 106. In various embodiments, the particle matter mass concentration calculation circuitry 208 may be configured to determine the approximate collective mass of a plurality of particles present within the volume of fluid based on a determined collective mass of the plurality of particles 120 received by the collection media 106. In various embodiments, the particle matter mass concentration calculation circuitry 208 may be configured to determine the particulate matter mass concentration within the volume of fluid based on the approximate collective mass of the plurality of particles present within the volume of fluid. In various embodiments, the particle matter mass concentration calculation circuitry 208 may be configured to apply one or more scale factors to the determined particulate matter mass concentration within the volume of fluid to account for experimental inefficiencies such as, for example, particle collection efficiencies and detection probability factors. In various embodiments, an appropriate scale factor may be determined based on empirical data.

Moreover, the particle matter mass concentration calculation circuitry 208 may be configured to determine that the collection media 106 needs to be replaced. For example, in various embodiments, the particle matter mass concentration calculation circuitry 208 may be configured to determine that a threshold amount of time has passed since the collection media 106 was last replaced, that the number of particles present within the collection media 106 has surpassed a predetermined threshold number of particles, and/or that a percentage of particle coverage within a field of view has surpassed threshold particle coverage value.

In various embodiments, the device 10 may be configured to determine an amount of time for which a device 10 (e.g., a pump 112) should remain in operation by drawing fluid through the device 10 so as to cause at least a predetermined volume of fluid to be directed toward (e.g., pass across a surface of) a collection media 106. The predetermined volume of fluid may be defined by a threshold volume of fluid (e.g., a minimum volume of fluid, a maximum volume of fluid) or an acceptable range of fluid volume (e.g., between a minimum and a maximum volume of fluid). In certain embodiments, the volume of fluid passing through the device 10 may be measured (e.g., by a fluid flow sensor), however in other embodiments the volume of fluid passing through the device 10 may be estimated (e.g., based on a known fluid flow rate) while the pump is in an operating configuration and an amount of time the pump is in the operational configuration. For example, in various embodiments, the particle matter mass concentration calculation circuitry 208 may be configured to generate and/or transmit one or more signals so as to cause the fluid composition sensor 100 to initiate a particle collection operation, as described herein, wherein the sensor 100 may receive a volume of fluid comprising a plurality of particles and facilitate the engagement of a collection media 106 by the received volume of fluid such that at least a portion of the plurality of particles within the volume of fluid may be disposed at and/or into the collection media 106. For example, in various embodiments, particle matter mass concentration calculation circuitry 208 may be configured to emit one or more signals so as to cause a pump 112 to transition from an "OFF" configuration to an "ON" operational configuration. Conversely, in various embodiments, the particle matter mass concentration calculation circuitry 208 may be configured to emit one or more signals so as to cause a pump 112 to transition from an "ON" operational configuration to an "OFF" configuration. As non-limiting examples, the particle matter mass concentration calculation circuitry 208 may be configured to emit one or more signals so as to cause a pump 112 to transition from an "ON" operational configuration to an "OFF" configuration based at least in part on a determination that a threshold amount of time has elapsed and/or a threshold volume of fluid has been received by the fluid composition sensor 100 during an operation state. In various embodiments, such a determination may be made by the particle matter mass concentration calculation circuitry 208 based at least in part on data collected by a fluid flow sensor of the fluid composition sensor 100 that is configured to detect the flow rate of a volume of fluid passing through at least a portion of the sensor 100. In various embodiments, the fan or pump 112 is calibrated, such that the flow rate of fluid moving through the device is known/determined based at least in part on the operating characteristics (e.g., operating power) of the fan or pump 112.

In some embodiments, the device 10 includes a fluid composition sensor 100 configured to receive a volume of fluid having: a collection media 106 housing configured to receive and secure at least a portion of a collection media 106 for receiving one or more particles of a plurality of particles within the volume of fluid; a pump 112 to move a volume of fluid over the collection media 106 housing; an imaging device 110 configured to capture an image of at least a portion of one or more particles of the plurality of particles received by the at least one collection media 106; and a particle matter mass concentration calculation circuitry 208 connected with the imaging device 110 and the pump 112. The particle matter mass concentration calculation circuitry 208 is configured to calculate a total particle matter mass of one or more particles of the plurality of particles received by the at least one collection media 106 based on the image thereof. The particle matter mass concentration calculation circuitry 208 is configured to adjust the volume of fluid over the collection media 106 housing.

In various embodiments, as described herein, the particle loading calculation circuitry 208 may be configured to adjust the operation of a fluid composition sensor 100, for example, by causing one or more operational characteristics of the fluid composition sensor 100 (e.g., pump on/off configuration, pump volumetric flow rate, and/or the like) to be adjusted. For example, the particle loading calculation circuitry 208 may be configured to adjust the operation of a pump 112 of the fluid composition sensor 100, for example, by causing one or more operational characteristics of the pump 112 to be adjusted (e.g., stopped) before the collection media 106 has captured a quantity of particles that deteriorates the accuracy of the measurements of future captured particles (e.g., because the collection media is sufficiently filled with particles that newly captured particles cannot be identified and/or edges of those particles cannot be accurately located). For example, as described herein, a fluid composition sensor 100 configured to receive a volume of fluid comprising a plurality of particles such that at least a portion of the particles become disposed on and/or in a collection media 106, and further to determine a at least one of a particle matter mass, particle coverage value, and/or any other particle load condition defined by the plurality of particles disposed at the collection media 106, may experience increased inaccuracies caused by measurement errors arising from the physical saturation and/or deterioration of the collection media over time due to prolonged collection of a plurality of particles. In various embodiments, a particle load condition as described herein may be defined at least in part by a spatial arrangement of a plurality of particles disposed at a collection media (e.g., particle clustering, spiking, particle touching, particles on top of each other, and/or the like), a particle coverage value, an average gray scale of all pixels in a captured image, a particle matter mass, a total light intensity, an amount of collected particles, calculated particle density, and/or the like.

For example, the increased frequency and/or degree of the aforementioned sensor inaccuracies may correspond to an increased quantity of particles collected at the collection media 106 (and the resulting physical properties of the collection media 106 changes as a result of the increase number of particles disposed therein). Accordingly, in various embodiments, one or more components of the collection media assembly (e.g., the collection media 106) as described herein may be replaceable such that a first collection media may be utilized in receiving a first plurality of particles from a first volume of fluid and may be removed from the sensor 100 and replaced with a second collection media that may be subsequently utilized in receiving a second plurality of particles from a second volume of fluid that is received by the sensor 100 after the first collection media is removed therefrom. In such an exemplary circumstance, the reduction of sensor accuracy caused by measurement errors arising from the physical saturation and/or deterioration of the collection media over time may be combatted by replacing an at least partially exhausted collection media with an at least substantially new media having fewer (e.g., zero) particles from a volume of fluid received by the sensor 100 engaged therewith.

In some embodiments, as described herein, the particle loading calculation circuitry 208 may be configured to determine when the plurality of particles received by the collection media 106 is arranged such that at least two of the particles are unevenly spaced, touching, clustered, and/or on top of one another. For example, two or particles of a plurality of particles may be aligned with one another relative to the imaging device in an exemplary circumstance wherein a first particle engages the collection media at a first time and at a first location about the receiving face, and a second particle subsequently engages the collection media at a second time—the second time be chronologically after the first time—and at the first location about the receiving face such that at least a portion of the second particle overlaps at least a portion of the first particle from the perspective of the imaging device. In such an exemplary circumstance, the positioning of the second particle on top of the first particle, as described, may prevent the entirety of the first particle from being captured in an image taken by an exemplary imaging device, and thus, may prevent the controller 200 from accurately analyzing the first particle according to one or more operations described herein. In such an exemplary circumstance, the controller may be configured to determine that a first portion of the plurality of particles at a first portion of the collection media exhibits a first collective particle density that is at least substantially different than a second collective particle density of a second portion of the plurality of particles at a second portion of the collection media, wherein the collective particle density may be defined by the number of particles of the plurality within a given surface area defining a portion of the collection media. In some embodiments, the device 10 (e.g., controller 200 in association with the imaging device) may be configured to actively monitor the spacing of the particles so as to maximize the operational efficiency of the device 10 and/or identify particle placement on the collection media 106.

In various embodiments, the controller 200 (e.g., particle matter mass concentration calculation circuitry 208) may be configured to calculate particle matter mass by at least using an image to calculate the total particle matter mass or to determine the amount of light that extends through the collection media 106. In some embodiments, the particle loading calculation circuitry 208 works with the particle imaging circuitry 206 to determine and/or characterize the spatial arrangement of one or more particles within a field of view of an imaging device, and/or the like, such as, for example, a spacing between particles. For example, in various embodiments, as described herein, an image captured by an exemplary imaging device may comprise a two-dimensional image (e.g., a photograph of at least a portion of the collection media) and/or a three-dimensional image (e.g., a three-dimensional digital reconstruction of at least a portion of the particles captured at the collection media based at least in part on two-dimensional locations of detected particles and focal depths associated with each of the plurality of particles, that may be indicative of a distance away from the imaging device and therefore may be indicative of a third dimensional position of each of the plurality of particles). Accordingly, in various embodiments, the particle loading calculation circuitry 208 may be configured to characterize the spacing between two particles of the plurality of captured particles by an image as a distance between the two particles, wherein distance between the two particles is defined by one or more of an x-component (e.g., a difference in respective x-coordinates), a y-component (e.g., a difference in respective y-coordinates), and a z-component (e.g., a difference in respective z-coordinates, which may be determined by a focal depth relative to an imaging device).

As described herein, the particle loading calculation circuitry 208 may be configured to calculate a percentage of particle coverage of a collection media within a field of view and, further, may determine that the calculated percentage of particle coverage is greater than a threshold particle coverage value. In some embodiments, the particle loading calculation circuitry 208 may be configured to calculate the percentage of particle coverage of the collection media 106 based at least in part on a determined percentage of an image (e.g., a percentage of the field of view of an imaging device) that is covered in particles. For example, in various embodiments, a portion of a collection media may be covered by a particle in an exemplary circumstance wherein the particle is disposed at the collection media and wherein a cross-sectional area of the particle is positioned between an imaging device and at least a portion of a thickness of the collection media such that the particle at least partially interrupts the line of sight between the imaging device and the at least a portion of the thickness of the collection media. As a non-limiting example, a plurality of particles received by a collection media may collectively cover at least a portion of the collection media. As described herein, the particle mass concentration calculation circuitry 208 may be configured to calculate a percentage of particle coverage of a collection media based at least in part on a comparison of the total surface area of the collection media (e.g., a receiving face) and the surface area of the collection media that is covered by the plurality of particle. In various embodiments, the particle loading calculation circuitry 208 may be configured to determine that the percentage of particle coverage of a collection media is greater than a predetermined threshold. As a non-limiting example, in various embodiments, a predetermined threshold of percentage of particle coverage may be at least approximately between 0.01% and 99.9%. Additionally, or alternatively, in various embodiments, as described herein, a percentage of particle coverage may be embodied by a particle coverage value generated by one or more circuitries of the controller 200 as a comparative value, score, ratio, coefficient, and/or the like that is defined by a percentage of a predetermined optimal particle coverage condition that is exhibited by captured particle data (e.g., a particle image). In such an exemplary circumstance, as a non-limiting example, a particle image showing a particle load condition with a lower particle coverage percentage than a predetermined optimal particle coverage condition may be assigned a particle coverage value of at least substantially less than 100%, a particle image showing a particle load condition with a particle coverage percentage that is at least substantially equal to the predetermined optimal particle coverage condition may be assigned a particle coverage value of 100%, and a particle image showing a particle load condition with a higher particle coverage percentage than the predetermined optimal particle coverage condition may be assigned a particle coverage value of at least substantially more than 100%. In such an exemplary circumstance, the particle loading calculation circuitry 208 may be configured to identify the collection media as "covered," and accordingly generate one or more signals configured to cause the adjustment of the operation of the fluid composition sensor, so as to facilitate the replacement of the covered collection media. As a non-limiting illustrative example, the predetermined threshold of percentage of particle coverage may be less than 1% in an exemplary circumstance wherein detecting the controller 200 is configured to detect the presence of a single particle, such as, for example, in a circumstance related to a "clean room" application.

In some embodiments, the particle loading calculation circuitry 208 may be configured to determine if at least a portion of the plurality of the particles received by the fluid composition sensor 100 are clustering at the collection media 106 based at least in part on one or more images of the collection media 106. In various embodiments, the particle loading calculation circuitry 208 may be configured to determine that a plurality of particles received by a fluid composition sensor 100 are clustered such that boundaries of the plurality of particles are at least substantially overlapping or are spaced less than a clustering threshold distance to define individual clusters, and a plurality of clusters (each comprising a plurality of particles having overlapping boundaries) are spaced a distance apart (such that individual clusters are separated and discrete from one another) where a first portion of the collection media exhibits a first particle coverage value, as described above, that is disproportionate relative to a second particle coverage value detected at a second portion of the collection media. For example, in some embodiments, the particle loading calculation circuitry 208 may be configured to determine if the particles are clustering by calculating the average distance between at least a portion of the particles. In some embodiments, the particle loading calculation circuitry 208 is configured to determine that at least a portion of the plurality of the particles received by the fluid composition sensor 100 are clustering based at least in part on a determination that the calculated average distance between the particles at the collection media 106—as represented in an image—is below a predetermined distance. For example, in some embodiments, the particle loading calculation circuitry 208 is configured to determine when a percentage of the distances between particles is below a predetermined distance. In some embodiments, the particle loading calculation circuitry 208 is configured to cause (e.g., by transmitting one or more signals) the fluid composition sensor 100 to adjust the volume of fluid flowing over the collection media 106, such as, for example, by stopping the pump 112. In some embodiments, the particle loading calculation circuitry 208 is configured to provide a signal when it is determined that the particles are clustering. In some embodiments, the signal is connected to a display device. In some embodiments, the signal provided by the particle loading calculation circuitry 208 may provide a warning that may diagnose that an uneven airflow is present within the device 10.

In various embodiments, the particle matter mass concentration calculation circuitry 208 may be configured to cause the adjustment of the operation of the pump 112 of the fluid composition sensor 100 (e.g., between an on/off configuration, the volumetric flow rate, and/or the like based at least in part on a determination that a predetermined total particle matter mass threshold is reached. For example, the particle matter mass concentration calculation circuitry 208 may be configured to transmit one or more signals that, either directly or indirectly, cause the pump 112 to stop operating upon determining that a predetermined total particle matter mass threshold has been reached.

As a non-limiting example, in various embodiments, particle matter mass concentration calculation circuitry 208 may receive from an imaging device of the device 10 a first captured particle image and a second captured particle image, captured at a first time and a second time, respectively, wherein the first time represents the start of an analysis of the one or more particles of the plurality of particles 120 captured by the collection media 106 by the device 10 and the second time is subsequent the first time (occurs after the first time). In various embodiments, the particle matter mass concentration calculation circuitry 208 is configured to determine a first particle loading condition corresponding to the first image and determine a second particle loading condition corresponding to the second image. In various embodiments, the particle matter mass concentration calculation circuitry 208 is configured to compare the first total particle matter mass to the second total particle matter mass. In various embodiments, the particle matter mass concentration calculation circuitry 208 is configured to calculate a difference in first total particle matter mass and second total particle matter mass. For example, the particle matter mass concentration calculation circuitry 208 may be configured to calculate a difference in first total particle matter mass and second total particle matter mass by identifying any particles from the second captured particle image that were not captured in the first captured particle image. In various embodiments, the particle matter mass concentration calculation circuitry 208 may be configured to cause one or more operational characteristics of the pump 112 of the fluid composition sensor 100 (e.g., on/off configuration, volumetric flow rate, and/or the like) to be adjusted based at least in part on a determination that a calculated difference in first total particle matter mass and second total particle matter mass is more than a predetermined difference. For example, in various embodiments, the particle matter mass concentration calculation circuitry 208 may be configured to stop the pump 112 when a predetermined difference in first total particle matter mass and second total particle matter mass is calculated. In some embodiments, the particle loading calculation circuitry 208 is configured to determine the density of a particle concentration at a collection media 106 based at least in part on a captured particle image. For example, the particle loading calculation circuitry 208 may be configured to compare a calculated particle density to one or more stored particle density thresholds and accordingly cause one or more operational characteristics of the pump 112 to be adjusted based on a determination that the calculated particle density is greater than the particle density threshold. Additionally, or alternatively, the particle loading calculation circuitry 208 may be configured to cause one or more operational characteristics of the pump 112 to be adjusted based on a determination that the calculated particle density is less than a particle density threshold.

In various embodiments, as described herein, the particle matter mass concentration calculation circuitry 208 is configured to determine if the total particle matter mass is clustered. In various embodiments, the imaging device 110 is configured to capture images at a set interval. In various embodiments, the imaging device 110 is configured to capture an image at the start of the flow of the volume of fluid over the collection media 106 housing. In various embodiments, the particle matter mass concentration calculation circuitry 208 is configured to determine if the start of the flow of the volume of fluid causes a spike in one or more particle loading conditions, such as, for example, the particle matter mass. In various embodiments, a spike in a particle loading condition may be defined as a rapid increase in the particle loading condition, such as, for example, a rapid increase in the particle matter mass, with time. As a non-limiting, illustrative example, a spike could be defined as a rate of increase in one or more particle loading conditions that exceeds a defined threshold, such as, for example, a rate of increase of a particle matter mass that is determined to exceed a predetermined rate of particle matter mass increase threshold. In some embodiments, the particle matter mass concentration calculation circuitry 208 is configured to calculate a percent increase in particle matter mass over time, such as, for example, a rate of increase in calculated particle matter mass in successive measurements. In some embodiments, the particle matter mass concentration calculation circuitry 208 is configured to provide a signal indicating that the percent increase in the one or more particle loading conditions over time is above or below a predetermined threshold. As a non-limiting illustrative example, a detection of a spike, as defined herein, by the controller may correspond to a determination that, for example, the imaging device, the collection media, the illumination source, and/or any other component of the fluid composition sensor 100 may have been dirty upon the initiation of the particle collection operation and/or that the device 10 needs to be recalibrated.

In various embodiments, the particle matter mass concentration calculation circuitry 208 may be configured to calculate a total particle matter mass of one or more particles of the plurality of particles received by the at least one collection media 106 based at least in part by determining a total intensity of light across an image captured by an imaging device, as described herein. In various embodiments, the total light intensity may correspond to a measurement based at least in part on an imaging device, such as, for example, a CMOS image sensor. As a non-limiting illustrative circumstance, the total light intensity may be measured based at least in part on an average bit count of each pixel associated with the imaging device and/or an image produced by the imaging device. For example, an exemplary calculation of total light intensity may be executed as a function of time during an operation whereby the device 10 (e.g., controller 200) measures one or more raw signals from each pixel in an imager array corresponding to the imaging device. In various embodiments, the total intensity of light—as depicted in an image of the collection media 106 and the plurality of particles received thereby—may be based at least in part on a particle type, an average refractive index, an opacity of a particle at an optimal source wavelength (e.g., 850 nm), and/or the like associated with at least a portion of the plurality of particles captured at the collection media. As a non-limiting, illustrative example, the total intensity of light may be at least substantially inversely proportional to the particle concentration and/or the particle mass matter of the plurality of particles captured in the image (e.g., at the collection media 106 and within the field of view of the imaging device). In various embodiments, the particle matter mass concentration calculation circuitry 208 may be configured to cause the adjustment of the operation of the pump 112 of the fluid composition sensor 100 (e.g., on/off configuration, volumetric flow rate, and/or the like) based at least in part on a determination that a calculated total light intensity is less than a predetermined threshold. For example, in various embodiments, the particle matter mass concentration calculation circuitry 208 may be configured to generate one or more signals configured to cause the pump 112 to stop operating (e.g., to transition from an "ON" operational configuration to an "OFF" configuration) upon determining that the total intensity of light across the image is less than a predetermined intensity threshold.

In various embodiments, the particle matter mass concentration calculation circuitry 208 is configured to determine a total intensity of light across an image captured by an imaging device, wherein the image depicts at least a portion of a collection media using gray scale. In such an exemplary circumstance, an image depicting the collection media using gray scale may include one or more of a plurality of particles disposed at the collection media represented by an indicator, such as, for example, one or more areas of a relatively dark color (e.g., relative to the collection media) so as to distinguish the collection media from the one or more particles disposed thereon. In various embodiments, the size, shape, color, and/or the like of the one or more indicators corresponding to particles of the plurality disposed at the collection media may proportionately vary based at least in part on the collective mass, density, size, and/or the like of the one or more particles corresponding thereto. As a non-limiting example, in some embodiments, the particle matter mass concentration calculation circuitry 208 may be configured to determine a particle coverage value based at least in part on the number and/or coverage percentage (e.g., relative to the portion of the collection media depicted in a gray scale image) of the one or more dark spots present in an exemplary gray scale image of a collection media. A calculated total light intensity is less than a predetermined threshold. In some embodiments, the particle matter mass concentration calculation circuitry 208 may be configured to cause one or more operational characteristics of the pump 112 of the fluid composition sensor 100 (e.g., on/off configuration, volumetric flow rate, and/or the like) to be adjusted based at least in part on a determination that the number and/or coverage percentage (e.g., relative to the portion of the collection media depicted in a gray scale image) of the one or more dark spots present an exemplary gray scale image of a collection media. a calculated total light intensity is less than a predetermined threshold.

Various embodiments are directed to a method for detecting fluid particle characteristics comprising: directing the volume of fluid toward a collection media 106, receiving on the collection media 106 one or more particles of a plurality of particles within the volume of fluid; capturing an image of the one or more particles of the plurality of particles received by the collection media 106; determining a total particle matter mass of one or more particles of the plurality of particles received by the at least one collection media 106 based on the image thereof; and adjusting the volume of fluid.

In various embodiments, the total particle matter mass is determined by a particle matter mass concentration calculation circuitry 208 configured to operate together with a controller to adjust the volume of fluid passing over the collection media 106 and/or through the device 10 housing. In various embodiments, the particle matter mass concentration calculation circuitry 208 is configured to adjust the volume of fluid passing over the collection media 106 housing when a predetermined difference in a first total particle matter mass and a second total particle matter mass is calculated. In various embodiments, the particle matter mass concentration calculation circuitry 208 is configured to adjust the volume of fluid over the collection media 106 housing when the total intensity of light across the image is diminished to a predetermined threshold. In various embodiments, the pump 112 continues to operate to draw air through the device 10 as long as the intensity picture or light scale is above a predetermined threshold.

In various embodiments, one or more predetermined threshold values such as, for example, a particle coverage threshold, a particle separation threshold, a light intensity threshold, and/or the like, may be received by the fluid composition sensor 100 (e.g., the controller 200) as user input provided via a user interface. For example, in some embodiments, user input received by a controller 200 may be transmitted to the particle matter mass concentration calculation circuitry 208 and may comprise a fluid and/or material being sampled. In such an exemplary circumstance, the particle matter mass concentration calculation circuitry 208 may be configured to identify a corresponding predetermined threshold based at least in part on one or more look-up tables stored in memory 202 and associated with the user-selected fluid and/or material. As a non-limiting example provided by way of illustration, the particle matter mass concentration calculation circuitry 208 may be configured to receive a signal corresponding to a user selection of a material such as silica dust, which may be at least partially transparent to a wavelength of an exemplary light beam emitted from an illumination source within an exemplary fluid composition sensor, as described herein. In such an exemplary circumstance, the particle matter mass concentration calculation circuitry 208 may identify a corresponding light intensity threshold value using data stored in the memory (e.g., a look-up table). In various embodiments, the light intensity threshold identified as corresponding to the at least partially transparent silica dust material may vary from (e.g., may be less than) a light intensity threshold corresponding to a non-transparent material based at least in part on a contrast between covered and non-covered portions of the collection media, as described herein. As a further non-limiting example, a light intensity threshold identified as corresponding to a non-transparent material, such as, for example, volcanic ash or fire soot, may vary from (e.g., may be greater than) a light intensity threshold corresponding to an at least partially transparent material based at least in part on a contrast between covered and non-covered portions of the collection media.

In various embodiments, a fluid composition sensor comprising a controller (e.g., particle matter mass concentration calculation circuitry 208) configured to calculate total particle matter mass of a plurality of particles received from within a volume of fluid by a collection media and characterize the spatial arrangement of the plurality of particles so as to identify one or more particle configurations known to negatively affect sensor accuracy and/or sensor effectiveness over time (e.g., lifespan), such as, for example, particle clustering, spiking, particle touching, particles on top of each other, and/or a collection media "covered" by particles, may facilitate the prevention of sensor inaccuracies caused by overloading an exhausted and/or compromised collection media with a particle loading condition that cannot accurately be determined and/or identified by the sensor. Such an exemplary configuration substantially minimizes the amount of retesting required to obtain accurate data and prevents over-use of the fluid composition sensor by defining operational parameters configured to substantially autonomously limit the operation of the sensor upon identifying the presence of one or more of the aforementioned error-inducing particle load conditions. By dynamically monitoring the load condition of the plurality of particles received by the collection media and optimizing the operational parameters so as to selectively limit the run time of the device, the longevity of the device may be increased. Further, the device as described herein may further simplify the calculation of the requisite operational run time of the fluid composition sensor needed to a sample of particles sufficient to provide one or more statistically significant measurements.

Further, in various embodiments, the particle matter mass concentration calculation circuitry 208 may be configured to determine a particle initial velocity for one or more particles of the plurality of particles 120 received by the collection media 106 based at least in part the determined particle mass of the particle, wherein the particle initial velocity is a velocity of the particle at the receiving surface 105 of the collection media 106. In various embodiments, the particle matter mass concentration calculation circuitry 208 may be configured to transmit the determined particle initial velocity data corresponding to one or more of the particles of the plurality of particles 120 received by the collection media 106 to the particle type identification circuitry 207.

In various embodiments, the processor 202 may be configured to communicate with the sensor sampling optimization circuitry 209. In various embodiments, the sensor sampling optimization circuitry 209 may be a device or circuitry embodied in either hardware or a combination of hardware and software that is configured to determine an optimal sample volume associated with a sample collection operation being executed by the fluid sampling device 10 (e.g., by a fluid composition sensor) based at least in part on an identified particle load condition defined by a plurality of particles captured at a collection media of the fluid composition sensor. For example, the sensor sampling optimization circuitry 209 may be configured to determine an optimal sample volume associated with a sample collection operation based at least in part on first particle load data generated based at least in part on first particle data captured at a first instance during the sample collection operation. The sensor sampling optimization circuitry 209 may be configured to receive particle load data identifying a particle load condition from the particle imaging circuitry 206, an external device, and/or the like, the particle load condition being defined by the plurality of particles present at the collection media of a fluid composition sensor at an instance associated with particle data captured by the fluid composition sensor during a sample collection operation. For example, in various embodiments, the sensor sampling optimization circuitry 209 may be configured to receive first particle load data identifying a first particle load condition comprising a first particle coverage value defined by the first plurality of particles associated with first particle data (e.g., a first particle image) captured by an imaging device of a fluid composition sensor at a first instance.

Figure 5:
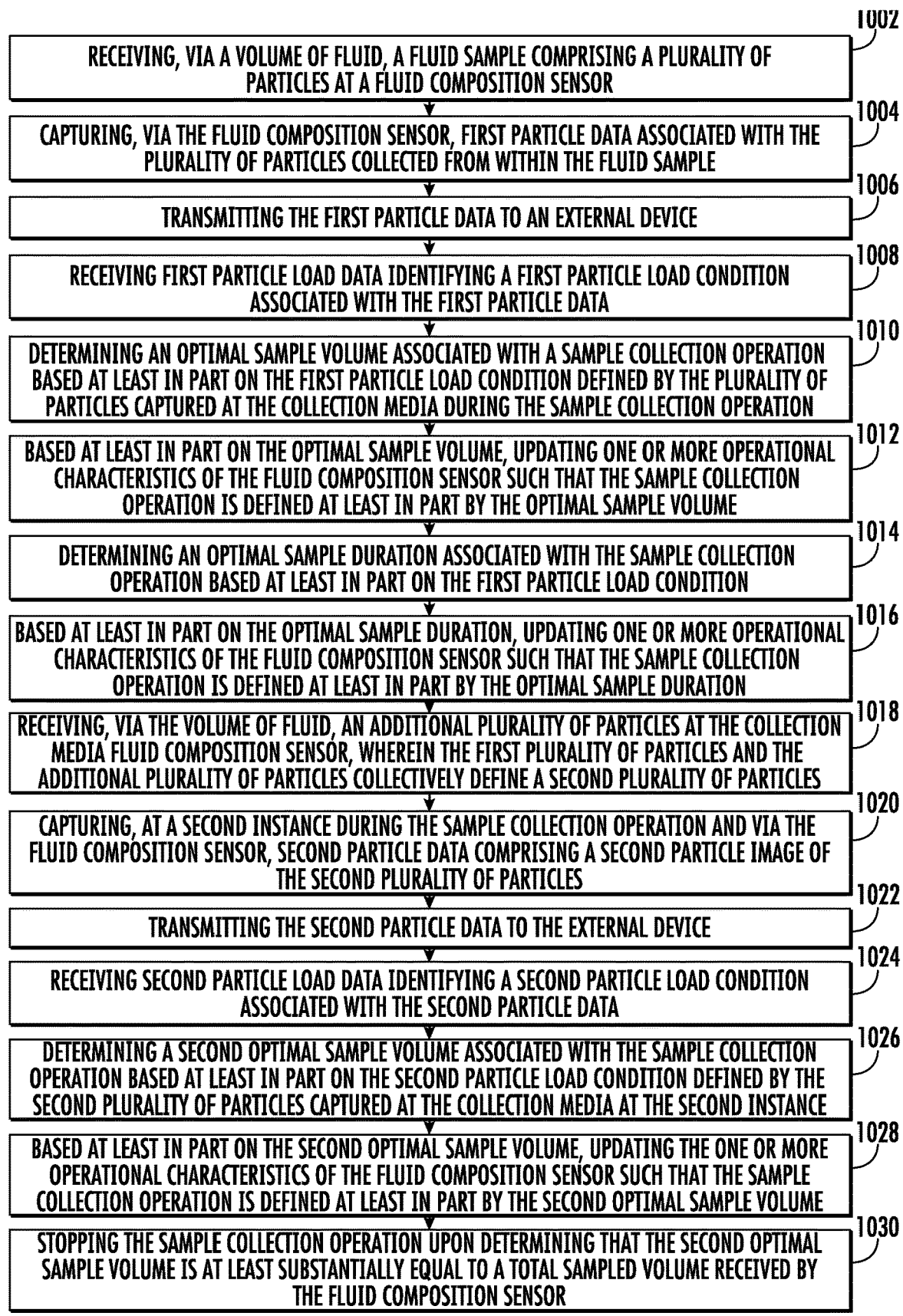
FIG. 5 is an illustrative flowchart of various steps for an example method in accordance with various embodiments of the present disclosure.

In various embodiments, the sensor sampling optimization circuitry 209 may be configured to determine an optimal sample volume associated with a sample collection operation based at least in part on the received particle load data, such as, for example, based at least in part on an identified first particle load condition defined by the plurality of particles captured at the collection media at the first instance during the sample collection operation. In various embodiments, the fluid sampling device 10 (e.g., the sensor sampling optimization circuitry 209 of controller 200) may be configured to determine an optimal sample volume comprising a volume of sample fluid that a device 10 (e.g., a fluid composition sensor) should sample during a sampling collection operation by drawing fluid through the device 10 so as to cause the determined optimal sample volume to be directed toward (e.g., pass across a surface of) a collection media 106. In certain embodiments, the volume of fluid passing through the device 10 may be measured (e.g., by a fluid flow sensor), however in other embodiments the volume of fluid passing through the device 10 may be estimated (e.g., based on a known fluid flow rate) while the pump is in an operating configuration and an amount of time the pump is in the operational configuration. As described herein, the optimal sample volume determined by the sensor sampling optimization circuitry 209 may be associated with a sample collection operation being executed by the fluid sample device 10 (e.g., by a fluid composition sensor), and may comprise a fluid sample volume of a fluid sample that is received by the fluid composition sensor (e.g., sampled) during the sample collection operation wherein, at the conclusion of the sample collection operation (e.g., after the entirety of the fluid sample having the optimal sample volume has been sampled by the fluid composition sensor), the plurality of particles collected at the collection media of the fluid composition sensor defines a particle load condition that is at least substantially similar to a predetermined optimal particle load condition. For example, in various embodiments, the sensor sampling optimization circuitry 209 may be configured to execute one or more of the operations described herein in reference to Block 1010, as illustrated in FIG. 5. For example, in various embodiments, the sensor sampling optimization circuitry 209 may be configured to compare a predetermined optimal particle load condition, as described herein, to a first particle load condition comprising a first particle coverage value defined by the first plurality of particles at the collection media at the first instance, and, further based on an identified first elapsed time (e.g., a known amount of time elapsed between the start of a sample collection operation and the first instance) and a known volumetric flow rate of the fluid composition sensor, estimate an optimal sample volume to be sampled during the sample collection operation.

In various embodiments, the sensor sampling optimization circuitry 209 may be further, configured to, based at least in part on the optimal sample volume, update one or more operational characteristics of the fluid composition sensor such that the sample collection operation is defined at least in part by the optimal sample volume. For example, in various embodiments, upon determining the optimal sample volume of a sample collection operation based at least in part on the first particle loading data, the sensor sampling optimization circuitry 209 may be configured to update an operational characteristic of the fluid composition sensor, such as the total sample volume associated with the sample collection operation to reflect the determined optimal sample volume. For example, as described herein, updating the total sample volume associated with the sample collection operation may comprise providing one or more updated executable instructions to one or more circuitries of the controller 200 (e.g., the processor 202, the memory 201, and/or the like) that the sample collection operation is to be executed such that a total sample volume at least substantially similar to the optimal sample volume is received (e.g., sampled) by the fluid composition sensor during the sample collection operation. For example, in various embodiments, the sensor sampling optimization circuitry 209 may be configured to execute one or more of the operations described herein in reference to Block 1012, as illustrated in FIG. 5.

Additionally, or alternatively, in various embodiments, the fluid sampling device 10 (e.g., the sensor sampling optimization circuitry 209 of controller 200) may be configured to determine an optimal sample duration comprising an amount of time for which a device 10 (e.g., a pump 112) should continue to execute a sampling collection operation by drawing fluid through the device 10 so as to cause the determined optimal sample volume to be directed toward (e.g., pass across a surface of) a collection media 106. As described herein, the optimal sample duration may be based at least in part on the received first particle load data identifying the first particle load condition as defined by the first plurality of particles captured at the first instance. In various embodiments, the sensor sampling optimization circuitry 209 may be configured to execute one or more of the operations described herein in reference to Block 1014, as illustrated in FIG. 5. For example, in various embodiments, the sensor sampling optimization circuitry 209 may be configured to compare a predetermined optimal particle load condition, as described herein, to a first particle load condition comprising a first particle coverage value defined by the first plurality of particles at the collection media at the first instance, and, further based on an identified first elapsed time (e.g., a known amount of time elapsed between the start of a sample collection operation and the first instance), estimate an optimal sample duration for which the sample collection operation should be executed.

In various embodiments, upon determining an optimal sample volume, an optimal sample duration, and/or the like at an instance during a sample collection operation (e.g., a first instance), the sensor sampling optimization circuitry 209 may be configured to execute a comparison of such a determined optimal value (e.g., the optimal sample volume and/or the optimal sample duration) to one or more corresponding operating characteristics associated with the sample collection operation. For example, in various embodiments, the sensor sampling optimization circuitry 209 may be configured to compare an optimal sample volume determined based on the first particle data captured at the first instance, as described herein, to a total sampled volume associated with the sample collection operation at the first instance (e.g., the amount of fluid sampled between the start of the sample collection operation and the first instance). As a further non-limiting example, the exemplary method may comprise comparing an optimal sample duration determined based on the first particle data captured at the first instance, as described herein, to a first elapsed time associated with the sample collection operation at the first instance. In various embodiments, the sensor sampling optimization circuitry 209 may be configured to determine whether an optimal sample volume and/or an optimal sample duration determined based at least in part on first particle data captured at a first instance, for example, is at least substantially similar to a corresponding operational characteristic associated with the sample collection operation as measured at the first instance.

In various embodiments, the sensor sampling optimization circuitry 209 may be configured to determine that the optimal sample volume and/or the optimal sample duration determined based at least in part on first particle data captured at a first instance, for example, is not at least substantially similar (e.g., is at least substantially different) to a corresponding operational characteristic associated with the sample collection operation as measured at the first instance. In such an exemplary circumstance, the sensor sampling optimization circuitry 209 may be configured to execute an iterative optimization process, wherein the sensor sampling optimization circuitry 209 is configured to repeat one or more of the operations described above so as to determine a second optimal sample volume and/or a second optimal sample duration based at least in part on second particle load data generated using second particle data captured by a fluid composition sensor at a second instance during the sample collection operation. For example, In various embodiments, the sensor sampling optimization circuitry 209 may be configured to execute one or more of the iterative operations described herein in reference to Block 1026 and Block 1028, as illustrated in FIG. 5, including determining a second optimal sample volume associated with the sample collection operation based at least in part on the second particle load condition defined by the second plurality of particles captured at the collection media at the second instance, and based at least in part on the second optimal sample volume, updating the one or more operational characteristics of the fluid composition sensor such that the sample collection operation is defined at least in part by the second optimal sample volume. The sensor sampling optimization circuitry 209 may be configured to facilitate a dynamic determination of an optimal sample volume (e.g., and/or optimal sample duration) for a particular sample collection operation in at least substantially in real-time based at least in part on iterative particle data collected by a fluid composition sensor. For example, in various embodiments, the sensor sampling optimization circuitry 209 may be configured to determine an optimal sample volume and/or optimal sample duration for each of a plurality of intermittent instances within the sample collection operation, and, accordingly dynamically update the corresponding operational characteristics associated with the sample collection operation until the sensor sampling optimization circuitry 209 determines that an optimal sample volume and/or an optimal sample duration is at least substantially similar to a corresponding operational characteristic associated with the sample collection operation as measured at a particular instance.

In various embodiments, the sensor sampling optimization circuitry 209 may be configured to stop the sample collection operation being executed by a fluid composition sensor of the fluid sample device 10 upon determining that an optimal sample volume and/or an optimal sample duration is at least substantially equal to a total sampled volume received by the fluid composition sensor and/or an elapsed sample time, respectively, at a particular instance during the sample collection operation. For example, in various embodiments, upon determining that the first total sampled volume sampled by the fluid composition sensor between the start of the sample collection operation and the first instance is at least substantially equal to an optimal sample volume, the sensor sampling optimization circuitry 209 may be configured to generate and/or transmit one or more signals so as to cause the fluid composition sensor 100 to stop the sample collection operation, as described herein. As a further non-limiting example provided for illustrative purposes, upon determining that the second elapsed sample time having elapsed between the start of the sample collection operation and the second instance is at least substantially equal to a second optimal sample duration estimated by the sensor sampling optimization circuitry 209, the sensor sampling optimization circuitry 209 may be configured to generate and/or transmit one or more signals so as to cause the fluid composition sensor 100 to stop the sample collection operation, as described herein. In various embodiments, the sensor sampling optimization circuitry 209 may be configured to execute one or more of the operations described herein in reference to Block 1030, as illustrated in FIG. 5.

In various embodiments, as described herein, the sensor sampling optimization circuitry 209 may be configured to adjust the operation of a fluid composition sensor 100, for example, by causing one or more operational characteristics of the fluid composition sensor 100 (e.g., pump on/off configuration, pump volumetric flow rate, sample duration, total sample volume, and/or the like) associated with the sample collection operation to be adjusted. For example, the sensor sampling optimization circuitry 209 may be configured to adjust the operation of a pump 112 of the fluid composition sensor 100, for example, by causing one or more operational characteristics of the pump 112 to be adjusted (e.g., stopped) before the collection media 106 has captured a quantity of particles that deteriorates the accuracy of the measurements of future captured particles (e.g., because the collection media is sufficiently filled with particles that newly captured particles cannot be identified and/or edges of those particles cannot be accurately located). For example, the sensor sampling optimization circuitry 209 may be configured to adjust the operation of a fluid sample device 10 (e.g., fluid composition sensor), for example, by updating one or more stored settings, executable instructions, and/or the like associated the sample collection operation being executed by the fluid composition sensor. For example, in various embodiments, the sensor sampling optimization circuitry 209 may be configured to generate and/or transmit one or more signals so as to cause the fluid composition sensor 100 to initiate, reinitiate, and/or stop a sample collection operation, as described herein, wherein, during a sample collection operation, the sensor 100 may receive a volume of fluid comprising a plurality of particles and facilitate the engagement of a collection media 106 by the received volume of fluid such that at least a portion of the plurality of particles within the volume of fluid may be disposed at and/or into the collection media 106. For example, in various embodiments, sensor sampling optimization circuitry 209 may be configured to emit one or more signals so as to cause a pump 112 to transition from an "OFF" configuration to an "ON" operational configuration. Conversely, in various embodiments, the sensor sampling optimization circuitry 209 may be configured to emit one or more signals so as to cause a pump 112 to transition from an "ON" operational configuration to an "OFF" configuration. As non-limiting examples, the sensor sampling optimization circuitry 209 may be configured to emit one or more signals so as to cause a pump 112 to transition from an "ON" operational configuration to an "OFF" configuration based at least in part on a determination that a total sampled volume received by the fluid composition sensor during the sample collection operation is at least substantially equal to the optimal sample volume. As a further non-limiting example, sensor sampling optimization circuitry 209 may be configured to emit one or more signals so as to cause a pump 112 to transition from an "ON" operational configuration to an "OFF" configuration based at least in part on a determination that an elapsed sample time (e.g., an amount of operational runtime of the pump during the sample collection operation) is at least substantially equal to the optimal sample duration.

In various embodiments, the sensor sampling optimization circuitry 209 may be configured to facilitate a fluid composition sensor configuration wherein a sample collection operation is paused during the imaging and/or analysis of the plurality of particles captured at a collection media. For example, in various embodiments, the sensor sampling optimization circuitry 209 may be configured to emit one or more signals so as to cause a pump 112 to transition from an "ON" operational configuration to an "OFF" configuration at a first instance so as to enable the imaging device of the sensor 100 to capture first particle data during a non-operational state. In such an exemplary circumstance, upon the first particle data being processed, first particle load data comprising a first particle load condition being generated, and the first particle load data being received, the sensor sampling optimization circuitry 209 may process the received first particle load data so as to determine that an optimal sample volume and/or an optimal sample duration based thereon is at least substantially different than a first total sampled volume and/or a first elapsed sample time, respectively, as measured at the first instance. In such an exemplary circumstance, the sensor sampling optimization circuitry 209 may be configured to emit one or more signals so as to cause a pump 112 to transition from an "OFF" operational configuration to an "ON" configuration so as to facilitate continued execution of the sample collection operation by the fluid composition sensor. In various embodiments, the sensor sampling optimization circuitry 209 may be configured to account for a non-continuous sample collection operation defined by one or more intermittent pauses by determining an optimal sample volume and/or an optimal sample duration using input variables, such as, for example, total sampled volume, elapsed sample time, and/or the like, that are defined by values collected solely during operational runtime of the sensor, rather than over the totality of the sample duration starting at the starting instance of the sample collection operation.

Figure 3A:
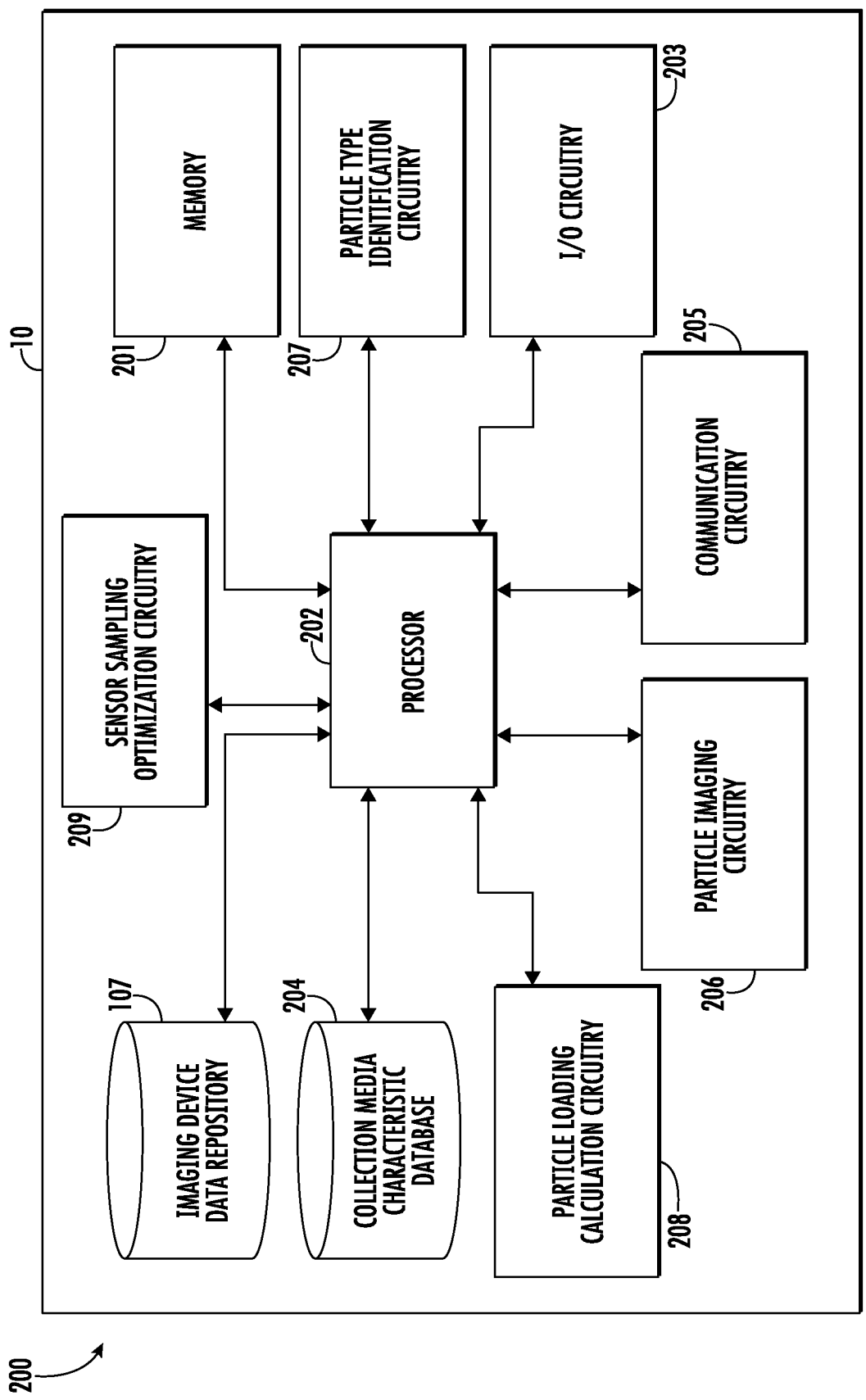
FIGS. 3A-3B illustrate a schematic views of various exemplary apparatuses in accordance with various embodiments.
Figure 3B:
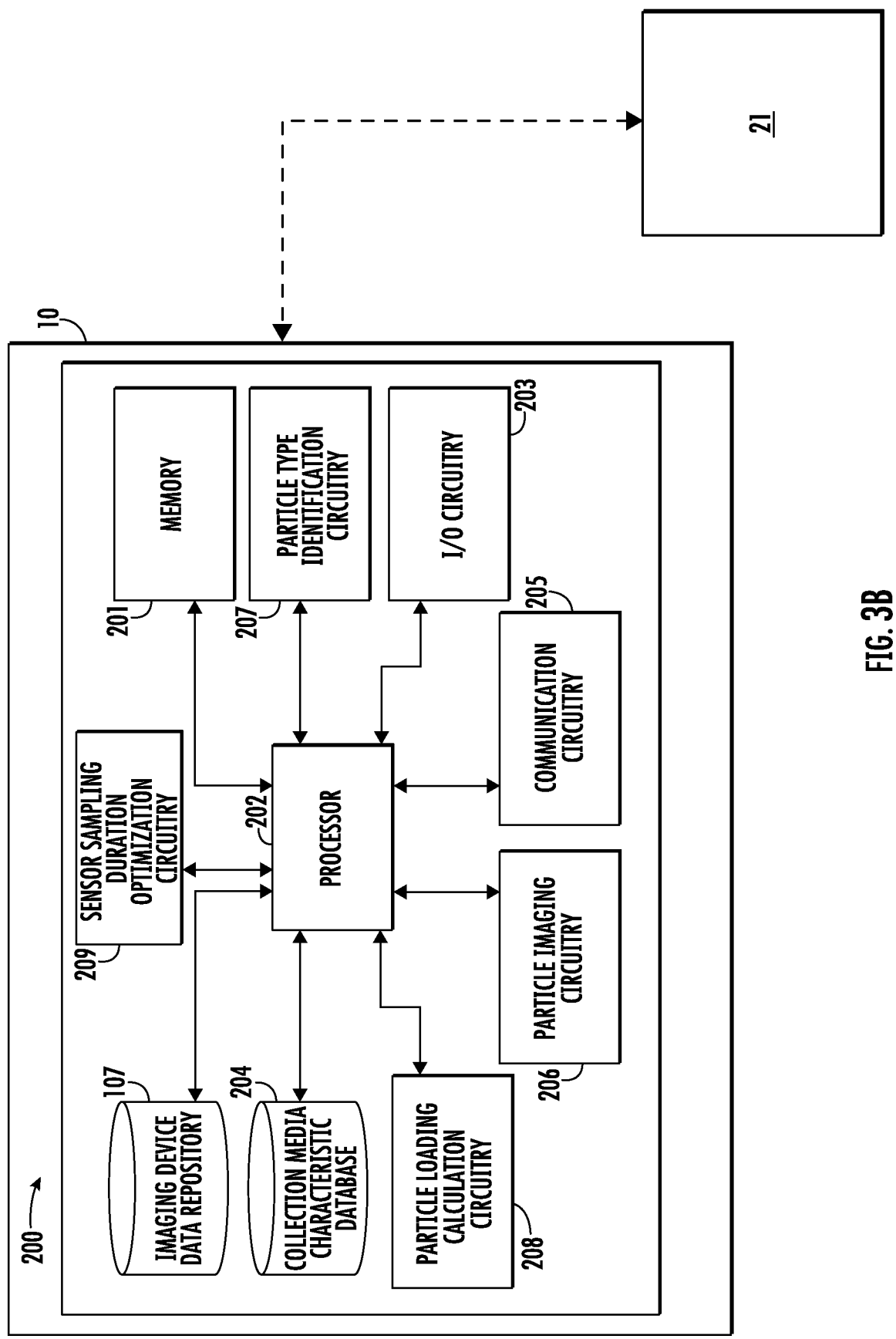

In various embodiments, at least a portion of one or more operations described above with respect to the controller 200 may be executed by one or more external devices, such as, for example, a client device 21 executing a mobile application and in communication with the fluid sampling device 10, as illustrated in FIG. 3B. For example, in various embodiments, the fluid sampling device may be configured to transmit particle data captured by a fluid composition sensor (e.g., an imaging device) at one or more instances during a sample collection operation such that at least a portion of the data processing operations described above with respect to various circuitries of the exemplary controller 200 (e.g., particle imaging circuitry 206, particle type identification circuitry 207, particle matter mass concentration calculation circuitry 208, and/or sensor sampling optimization circuitry 209) may be carried out at least in part by an external device (e.g., client device 21, a cloud-based management computing entity, and/or the like). As a non-limiting example, a fluid sampling device 10 may be configured to capture first particle data using a fluid composition sensor (e.g., an imaging device) and transmit the first particle data to a client device 21 executing a mobile application the is configured to carry out one or more executable instructions to analyze the first particle data (e.g., a first particle image) captured by the fluid composition sensor and generate particle loading data that includes an identified a particle loading condition defined by the plurality of particles present within the collection media 106 at the first instance, as captured in the first particle data. In various embodiments, as described herein, the external device may be configured to transmit data generated based at least in part on particle data received from the fluid sampling device 10 back to the fluid sampling device (e.g., a controller 200) for further processing and/or analysis.

Figure 4:
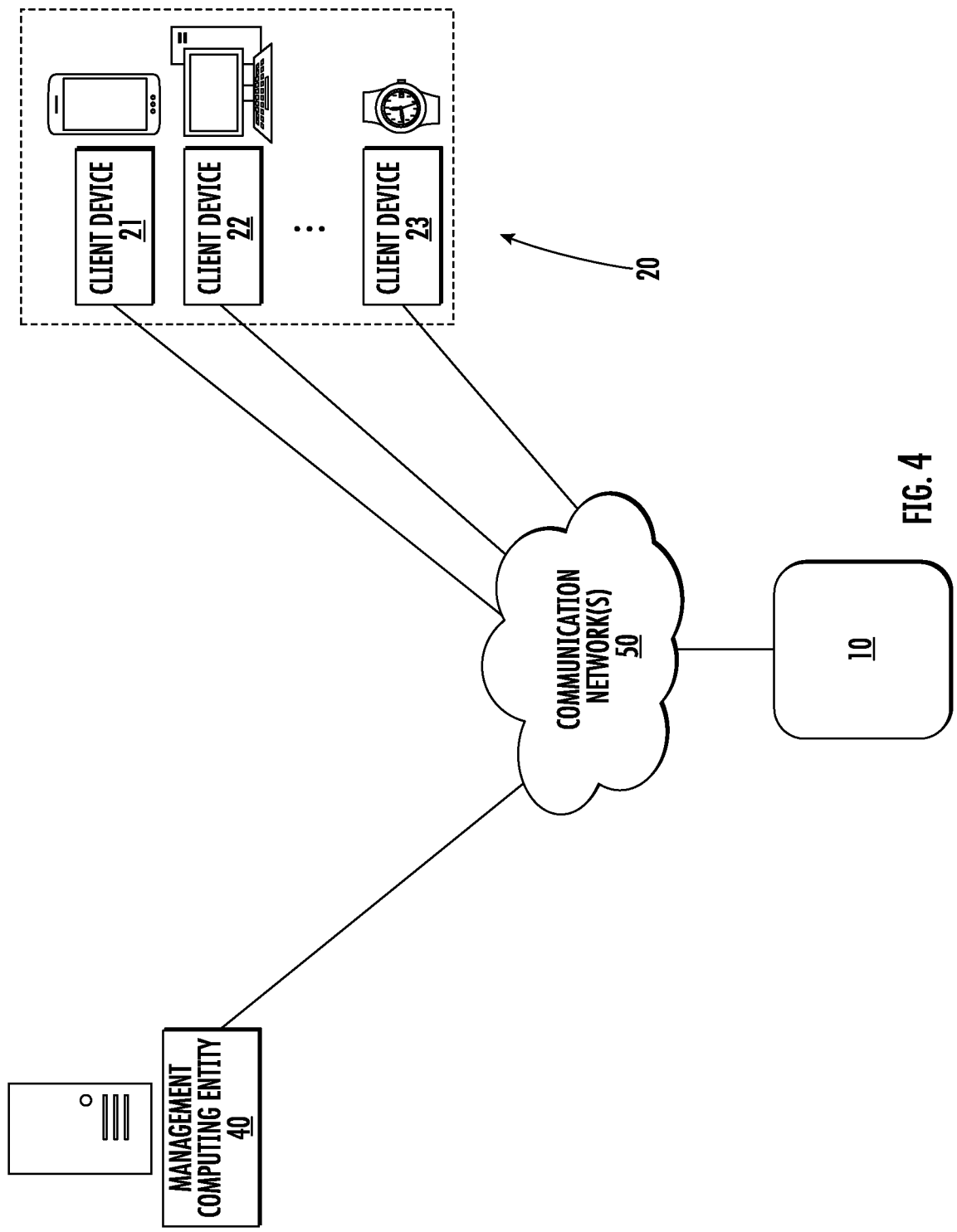
FIG. 4 schematically illustrates various data flows between exemplary devices in accordance with some embodiments discussed herein.

FIG. 4 further schematically illustrates various data flows between exemplary devices in accordance with some embodiments discussed herein. As shown in FIG. 4, an exemplary fluid sampling device 10, as described herein, may be configured for communicating one or more data signals to one or more external devices, such as, for example, one or more client devices 20 (e.g., 21, 22, 23), a management computing entity 40, and/or the like. For example, various components of the fluid sampling device 10 may be in electronic communication with, for example, one or more client devices 20 (e.g., 21, 22, 23), a management computing entity 40 over various wireless or wired communication networks 50, as described herein. As described herein, an exemplary fluid sampling device 10 (e.g., a fluid composition sensor and/or a controller, as described herein) can be used to execute a sample collection operation based at least in part on one or more control signals, as described herein.

In various embodiments, a fluid sampling device 10 may be configured to communicate with one or more external devices, such as, for example, a client device 21 executing a mobile application and/or a managing computing entity 40 and/or the like. In various embodiments, a client device may include, without limitation, smart phones, tablet computers, laptop computers, wearables (e.g., a smart watch), personal computers, and/or the like. A client device may execute an "app" to interact with one or more components of the fluid sampling device 10, such as, for example, a fluid composition sensor and/or a controller, as described herein. In various embodiments, management computing entity 40 may comprise a computing device, such as, for example, a server, a cloud-based computing entity, and/or the like. In various embodiments, the management computing entity 40 may be accessed by authorized individuals and/or client devices. The management computing entity 40 may be configured to store and/or transmit data associated with fluid sampling device 10, such as, for example, particle data captured by a fluid composition sensor and/or an optimal sample volume associated with a sample collection operation.

In various embodiments, the fluid sampling device 10 may be in electronic communication with the one or more client devices 20 (e.g., 21, 22, 23) and a management computing entity 40 over the same or different wireless or wired networks 50 including, for example, a wired or wireless Personal Area Network (PAN), Local Area Network (LAN), Metropolitan Area Network (MAN), Wide Area Network (WAN), and/or the like. For example, in various embodiments, the one or more communication networks 50 described herein may use any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. Additionally, while FIG. 4 illustrates certain system entities as separate, standalone entities, the various embodiments are not limited to such an example particular architecture.

As described herein, an exemplary fluid sampling device 10 (e.g., a fluid composition sensor and/or a controller, as described herein) can be used to execute at least a portion of a sample collection operation. In various embodiments, a fluid sampling device 10 may be configured to transmit particle data captured by fluid sampling device (e.g., an imaging device of the fluid composition sensor) to an external device in order to facilitate execution of one or more data processing operations by the external device. In various embodiments, upon a fluid composition sensor capturing first particle data comprising a first particle image, a fluid sampling device 10 may be configured to transmit the first particle data to the one or more client devices 20 executing a mobile application such that the first particle data may be processed by the client device 20 via one or more executable actions, instructions, and/or the like defining the mobile application. For example, a client device (e.g., 21, 22, 23) may be configured to receive the particle data from the fluid sampling device 10 via a wireless communication network 50 and execute one or more data processing operations in order to determine a particle load condition defined by the plurality of particles captured at the collection media based on the first particle data (e.g., the first particle image) at the first instance. In various embodiments, as described herein, the particle load condition defined by the plurality of particles associated with the first particle data may comprise a particle coverage value determined at least in part by using a first particle image captured at the first instance. For example, in various embodiments, a particle loading condition, such as, for example, a particle coverage value may be defined at least in part by comparative data, images, particle characteristics, and/or the like that defines the first particle coverage value of the plurality of particles captured at the collection media at a first instance during a sample collection operation. In various embodiments, client device 21, 22, 23 may be configured to display at least a portion of the particle data captured by an exemplary fluid sampling device 10, including, as a non-limiting example, a particle image, particle load data, and/or the like, at an interface associated therewith. In various embodiments, the client device 21, 22, 23 that receives the first particle data captured by the fluid sampling device at the first instance during the sample collection operation may be configured to determine one or more particle load conditions at the first instance, such as, for example, the particle coverage value defined by the plurality of particles captured at the collection media of the fluid composition sensor using one or more algorithms defined by executable instructions. For example, the client device 21, 22, 23 may be configured to generate first particle load data identifying the first particle load condition based at least in part on the first particle data captured by the fluid sampling device 10 (e.g., the fluid composition sensor). In various embodiments, upon generating particle load data identifying a particle load condition comprising a particle coverage value, an external device (e.g., client device 21, 22, 23) may transmit the particle load data including the particle load condition to the fluid sampling device 10.

Further, in various embodiments, a management computing entity 40 may be similarly configured to receive the particle data from the fluid sampling device 10 via a wireless communication network 50 and execute one or more data processing operations in order to determine a particle load condition defined by the plurality of particles captured at the collection media based on the first particle data (e.g., the first particle image) at the first instance. In various embodiments, 40 may be configured to display at least a portion of the particle data captured by an exemplary fluid sampling device 10, including, as a non-limiting example, a particle image, particle load data, and/or the like, at an interface associated therewith. In various embodiments, a management computing entity 40 that receives the first particle data captured by the fluid sampling device at the first instance during the sample collection operation may be configured to determine one or more particle load conditions at the first instance, such as, for example, the particle coverage value defined by the plurality of particles captured at the collection media of the fluid composition sensor via one or more cloud-based operations defined at least in part by one or more executable instructions and/or algorithms. For example, the management computing entity 40 may be configured to generate first particle load data identifying the first particle load condition based at least in part on the first particle data captured by the fluid sampling device 10 (e.g., the fluid composition sensor). In various embodiments, upon generating particle load data identifying a particle load condition comprising a particle coverage value, an external device (e.g., management computing entity 40) may transmit the particle load data including the particle load condition to the fluid sampling device 10.

In various embodiments, a fluid sampling device 10 may be configured to transmit one or more data signals, such as, for example, one or more control signals and/or one or more informational signals to an external device in communication therewith, such as, for example, one or more client devices 20, a management computing entity 40, and/or the like. For example, in various embodiments, the fluid sampling device 10 may be configured to transmit a control signal to an external device, as described herein, providing one or more executable instructions to be processed and/or executed by the external device relating to various particle data transmitted therewith. Further, in various embodiments, the fluid sampling device 10 may be configured to transmit an instructional signal to an external device, as described herein, in order to provide one or more messages, confirmations, signals, and/or the like configured to communicate to the external device that a sample collection operation has been completed. Alternatively, or additionally, in various embodiments, the fluid sampling device 10 may be configured to transmit an instructional signal to an external device, as described herein, in order to provide various data associated with a sample collection operation, such as, for example, particle data captured at one or more instances during the sample collection operation, results and/or performance metrics of a sample collection operation (e.g., one or more operation characteristics of the fluid composition sensor as measured during execution of the sample collection operation), and/or the like.

As illustrated in FIG. 5, an exemplary method 1000 of operating a fluid sampling device may include, at Block 1002, receiving, via a volume of fluid, a fluid sample comprising a plurality of particles at a fluid composition sensor of an exemplary fluid sampling device. In various embodiments, the fluid sample may embody a sample volume of fluid that defines at least a portion of the volume of fluid and comprises a plurality of particles therein. In various embodiments, the volume of fluid defined in part by the fluid sample may correspond to a fluid within an ambient environment, such that the particles present within the fluid sample may be defined by one or more particle characteristics that are at least substantially similar to a particle characteristic of the fluid within the ambient environment (e.g., particle concentration). For example, in various embodiments, the plurality of particles received by an exemplary fluid composition sensor may be representative of a plurality of particles present within the fluid within the ambient environment. In various embodiments, an exemplary fluid composition sensor configured to receive the fluid sample may comprise an exemplary fluid composition sensor 100, as described herein in reference to FIG. 3, and/or any other suitable particle imaging sensor capable of measuring particle content within one or more volumes of fluid using one or more particle imaging operations. As described herein, an exemplary fluid composition sensor may be configured to receive one or more of the plurality of particles within the fluid sample at a collection media disposed therein. In various embodiments, the collection media may comprise an adhesive material medium (e.g., a sticky gel-like substance), a liquid medium, a solid or quasi-solid surface, a heated medium, and/or the like.

Further, at Block 1004, first particle data associated with the plurality of particles collected from within the fluid sample may be captured, via the fluid compensation sensor. In various embodiments, as described herein, first particle data associated with a fluid sample may be captured by a fluid compensation sensor. In various embodiments, the plurality of particles within the fluid sample may be received by the fluid composition sensor. In various embodiments, the first particle data may be captured by a fluid composition sensor configured to detect, measure, and/or characterize one or more particle characteristics (e.g., particle matter mass concentration, particle quantity, particle size, and/or the like) associated with the plurality of particles within the fluid sample and/or to facilitate a determination of a particle load condition defined by the plurality of particles collected at the collection media. As described herein, the first particle data may be captured by the fluid composition sensor at a first instance, where the first instance occurs in the midst of a sample collection operation being executed by the fluid composition sensor (e.g., the first particle data is captured at an instance that falls within the sample duration of the sample collection operation). For example, as described herein, first particle data associated with the plurality of particles and captured by a fluid composition sensor may comprise a particle image captured by an imaging device of the fluid composition sensor using one or more particle imaging techniques, such as, for example, lensless holography, fluorescent imaging, optical microscopy and/or the like. Further, in various embodiments, a fluid composition sensor may capture further first particle data using one or more image focusing techniques, such as a computational technique (e.g., Angular Spectrum Propagation) and/or a mechanical technique (e.g., opto-mechanical adjustment).

In various embodiments, the first particle data captured by the fluid composition sensor may further comprise additional particle data generated based at least in part on the captured particle image, such as, for example, particle load data, particle type data, particle matter mass concentration data, particle quantity data, particle size data, particle coverage value data, and/or the like, associated with the plurality of particles. Alternatively, in various embodiments, such additional particle data generated by a fluid composition sensor (e.g., a controller) based at least in part on the captured first particle image of the first particle data may be generated by an external device in communication with the fluid sampling device and configured to execute one or more particle analysis operations, such as, for example, a client device configured to communicate with a fluid sampling device and execute one or more particle analysis operations via a mobile application, as described herein. For example, at Block 1006, exemplary method 1000 may include transmitting the first particle data captured by a fluid composition sensor to an external device. In various embodiments, an external device may comprise a client device, such as, for example, a smartphone, tablet, personal computer, an entity server, a remote computing platform (e.g., a cloud-based server) and/or the like, configured to receive the first particle data from the fluid sampling device and execute one or more particle analysis operations based on the received first particle data.

In various embodiments, an external device may execute one or more data processing operations in order to determine a particle load condition defined by the plurality of particles captured at the collection media based on the first particle data (e.g., the first particle image) at the first instance. In various embodiments, as described herein, the particle load condition defined by the plurality of particles associated with the first particle data may comprise a particle coverage value determined at least in part by using a first particle image captured at the first instance. For example, in various embodiments, a particle loading condition, such as, for example, a particle coverage value may be defined at least in part by comparative data, images, particle characteristics, and/or the like that defines the first particle coverage value of the plurality of particles captured at the collection media at a first instance as a ratio, percentage, and/or the like of a predetermined optimal particle coverage value. For example, in various embodiments, a predetermined optimal particle load condition comprising a predetermined optimal particle coverage value may comprise a stored data value indicative of an at least substantially optimized particle coverage value. In such an exemplary circumstance, the first particle load condition may be defined by the particle coverage value and/or the ratio of the first particle coverage value to predetermined optimal particle coverage condition. Additionally, or alternatively, in various embodiments, as described herein, a first particle load condition may comprise a particle coverage value generated based at least in part on a first particle image as a comparative value, score, ratio, coefficient, and/or the like that is defined by a percentage of a predetermined optimal particle coverage condition that is exhibited by captured particle data (e.g., a particle image). In such an exemplary circumstance, as a non-limiting example, a first particle image showing the first particle load condition with a lower particle coverage percentage than a predetermined optimal particle load condition may be assigned a particle coverage value of at least substantially less than 100%, the first particle image showing the first particle load condition with a particle coverage percentage that is at least substantially equal to the predetermined optimal particle coverage condition may be assigned a particle coverage value of 100%, and the first particle image showing the first particle load condition with a higher particle coverage percentage than the predetermined optimal particle coverage condition may be assigned a particle coverage value of at least substantially more than 100%. The particle coverage value at the first instance of the plurality of particles captured at a collection media of a fluid composition sensor may be determined by the external device using one or more algorithms defined by executable instructions corresponding to the generation of first particle load data based on the first particle data captured by the fluid sampling device (e.g., the fluid composition sensor). In various embodiments, upon generating particle load data identifying a particle load condition comprising a particle coverage value, an external device may transmit the particle load data including the particle load condition to the fluid sampling device.

Referring now to Block 1008, exemplary method 1000 may further comprise receiving the first particle load data identifying the first particle load condition associated with the first particle data. For example, as described above in reference to Block 1006, in various embodiments wherein the first particle data is transmitted to an external device configured to executed one or more analysis operations in order to identify a particle load condition, the first particle load data may be received by the fluid sampling device from the external device to which the first particle data was transmitted. Alternatively, or additionally, in various embodiments, a fluid composition sensor and/or a controller of a fluid sampling device may receive the first particle load data from one or more other components of the fluid sampling device in communication therewith.

Further, at Block 1010, the method 1000 further comprises determining an optimal sample volume associated with a sample collection operation based at least in part on the identified first particle load condition defined by the plurality of particles captured at the collection media at a first instance during the sample collection operation. In various embodiments, an optimal sample volume may comprise a fluid sample volume that is configured such that, upon being sampled by an exemplary fluid composition sensor, a plurality of particles received by the collection media from the fluid sample volume defines a particle loading condition that is at least substantially similar to a predetermined optimal particle loading condition. For example, an optimal sample volume associated with a sample collection operation may comprise a fluid sample volume of a fluid sample that is received by the fluid composition sensor (e.g., sampled) during the sample collection operation wherein, at the conclusion of the sample collection operation (e.g., after the entirety of the fluid sample having the optimal sample volume has been sampled by the fluid composition sensor), the plurality of particles collected at the collection media of the fluid composition sensor define a particle load condition that is at least substantially similar to a predetermined optimal particle load condition. As a further example, an optimal sample volume associated with a sample collection operation may be defined by an amount of sample fluid that is estimated by a fluid sample device, as described herein, to contain a plurality of particles that will result in the particle data captured by the fluid composition sensor at an ending instance of the sample collection operation being defined at least in part by a particle load condition at the collection media of the fluid composition sensor that is at least substantially similar to a predetermined optimal particle load condition.

In various embodiments, the optimal sample volume may be determined based at least in part on the identified first particle load condition and a known elapsed time associated with the sample collection operation. In various embodiments, a first elapsed time associated with a first instance of the sample collection operation may be determined by a fluid sampling device (e.g., a controller) by identifying the runtime duration of a fluid composition sensor (e.g., the amount of that that the pump and/or fan of the fluid composition sensor has been operational so as to facilitate the particle collection operation of the sensor) between a starting instance of the sample collection operation and the first instance at which the first particle data was captured. Further, in various embodiments, the volumetric flow rate of a fluid sample moving through the fluid composition sensor may be known/determined based at least in part on the operating characteristics (e.g., operating power) of the fan or pump, such that a first total sampled volume at the first instance (e.g., the amount of fluid that has been sampled by the fluid composition sensor between the start of the sample collection operation and the first instance) may be identified. In various embodiments, the first elapsed time may be at least substantially directly proportional to the first total sampled volume, such that the optimal sample volume may be determined based at least in part on a comparison of the ratio of the first particle load condition to the optimal particle load condition (e.g., the ratio of the first particle coverage value to the predetermined optimal particle coverage value) to the ratio of the first total sampled volume to the optimal sample volume. For example, in various embodiments, the optimal sample volume may be at least substantially between 1 L and 1000 L (e.g., between 2 L and 150 L). As a non-limiting example, in various embodiments, the first elapsed time may be at least substantially directly proportional to the first total sampled volume. In such an exemplary circumstance, the relative particle characteristic may be determined using the equations below:

$$\text{Optimal Sample Volume} = \text{First Total Sample Volume} \left( \frac{\text{Optimal Particle Load Condition}}{\text{First Particle Load Condition}} \right)$$

For example, the exemplary relation described above, wherein the first elapsed time may be at least substantially directly proportional to the first total sampled volume, may define the operation of a fluid composition sensor in an exemplary circumstance wherein the volumetric flow rate of the fluid composition sensor is at least substantially constant and wherein the operation of the pump/fan of the fluid composition sensor is at least substantially continuous, such that the sample collection operation is not paused at an instance prior to the first instance. In various embodiments, one or more computational adjustments may be made in order to account for an exemplary circumstance wherein the first elapsed time is not at least substantially directly proportional to the first total sampled volume, such as, for example, in an exemplary circumstance wherein the fluid flow rate of a fluid composition sensor varies at one or more instances during a sample collection operation.

Further, at Block 1012, the method 1000 further comprises, based at least in part on the optimal sample volume, updating one or more operational characteristics of the fluid composition sensor such that the sample collection operation is defined at least in part by the optimal sample volume. In various embodiments, the operation of a fluid composition sensor may be defined by one or more operational characteristics, such as, for example, on/off configuration, volumetric flow rate, power consumption, runtime, total sample volume, and/or the like. In various embodiments wherein a fluid composition sensor is configured to execute a sample collection operation, one or more of the operational characteristics of the fluid composition sensor may be associated with the sample collection operation, such that the sample collection operation is defined by the one or more operational characteristics associated therewith. For example, in various embodiments, a sample collection operation may be defined at least in part by one or more operational characteristics of a fluid composition sensor corresponding to a sample duration and/or a total sample volume. As described herein, the sample duration and/or the total sample volume of the sample collection operation may be updated and/or adjusted by updating one or more operational characteristics of the fluid composition sensor, such as, for example, runtime and/or total sample volume. In various embodiments, upon determining the optimal sample volume of a sample collection operation based at least in part on the first particle loading data, an operational characteristic of the fluid composition sensor, such as the total sample volume associated with the sample collection operation may be updated to reflect the determined optimal sample volume. For example, updating the total sample volume associated with the sample collection operation may comprise providing one or more updated executable instructions to the fluid composition sensor (e.g., the controller) that the sample collection operation is to be executed such that a total sample volume at least substantially similar to the optimal sample volume is received (e.g., sampled) by the sensor.

By way of further non-limiting example, a sample collection operation may be optimized by dynamically determining an optimal sample duration based on particle data captured during the sample collection operation and calibrating one or more operational characteristics of fluid composition sensor accordingly. For example, as illustrated at Block 1014, the method 1000 may comprise determining an optimal sample duration associated with a sample collection operation based at least in part on the identified first particle load condition defined by the plurality of particles captured at the collection media at the first instance during the sample collection operation. In various embodiments, an optimal sample duration may comprise an amount of operational runtime sufficient for a fluid composition sensor to receive a plurality of particles at a collection media that defines a particle load condition that is at least substantially similar to a predetermined optimal particle loading condition. For example, an optimal sample duration associated with a sample collection operation may comprise a sample duration defined by a length of time, such as, for example, an amount of operational runtime for a fluid composition sensor, that is sufficiently long such that, upon that length of time having elapsed since a fluid composition sensor started a sample collection operation (e.g., since a starting instance of the sample collection operation), the plurality of particles received by a collection media during that length of time defines a particle loading condition that is at least substantially similar to a predetermined optimal particle loading condition. As a further example, an optimal sample duration associated with a sample collection operation may be defined by a sample duration of the sample collection operation that a fluid sampling device estimates would result in particle data that is captured by the fluid composition sensor after the optimal sample duration has elapsed (e.g., at an ending instance of the sample collection operation) being defined at least in part by a particle load condition that is at least substantially similar to a predetermined optimal particle load condition.

In various embodiments, the optimal sample duration may be determined based at least in part on the identified first particle load condition and a known elapsed time associated with the sample collection operation. In various embodiments, a first elapsed time associated with a first instance of the sample collection operation may be determined by a fluid sampling device (e.g., a controller) by identifying the runtime duration of a fluid composition sensor (e.g., the amount of that that the pump and/or fan of the fluid composition sensor has been operational so as to facilitate the particle collection operation of the sensor) between a starting instance of the sample collection operation and the first instance at which the first particle data was captured. In various embodiments, the optimal sample duration may be determined using at least the ratio of the first particle load condition to the optimal particle load condition (e.g., the ratio of the first particle coverage value to the predetermined optimal particle coverage value) and the first elapsed time. For example, in various embodiments, the first elapsed time may be at least substantially directly proportional to the first particle load condition (e.g., the first particle coverage value). For example, in various embodiments, the optimal sample duration may be at least substantially between 1 second and 30 minutes (e.g., between 10 seconds and 5 minutes). In such an exemplary circumstance, the relative particle characteristic may be determined using the equations below:

Optimal Sample Duration =

$$\text{First Elapsed Time} \left( \frac{\text{Optimal Particle Load Condition}}{\text{First Particle Load Condition}} \right)$$

Further, at Block 1016, the method 1000 may comprise, based at least in part on the optimal sample duration, updating one or more operational characteristics of the fluid composition sensor such that the sample collection operation is defined at least in part by the optimal sample duration. In various embodiments, as described herein, the sample duration the sample collection operation may be updated and/or adjusted by updating one or more operational characteristics of the fluid composition sensor, such as, for example, runtime and/or total sample volume. In various embodiments, upon determining the optimal sample duration of a sample collection operation based at least in part on the first particle loading data, an operational characteristic of the fluid composition sensor, such as the total sample volume associated with the sample collection operation may be updated to reflect the determined optimal sample duration. For example, updating the sample duration associated with the sample collection operation may comprise providing one or more updated executable instructions to the fluid composition sensor (e.g., the controller) that the sample collection operation is to be executed for a sample duration at least substantially similar to the optimal sample duration. Further, in various embodiments, updating the sample duration associated with the sample collection operation may comprise identifying the time remaining between the first instance and the optimal sample duration and providing one or more updated executable instructions to the fluid composition sensor (e.g., the controller) to continue execution of the sample collection operation for the identified remaining amount of time.

Referring now to Block 1018, exemplary method 1000 may include receiving, via the volume of fluid, an additional plurality of particles at the collection media of the fluid composition sensor, wherein the first plurality of particles and the additional plurality of particles collectively define a second plurality of particles. For example, in various embodiments, the additional plurality of particles received at the collection media of an exemplary fluid composition sensor may be representative of a plurality of particles present within a portion of the fluid sample received by the fluid composition sensor during a sample collection operation at a time subsequent to the first instance.

Further, at Block 1020, second particle data associated with the second plurality of particles collected from within the fluid sample may be captured, via the fluid compensation sensor at a second instance. In various embodiments, as described herein, second particle data associated with a fluid sample may be captured by a fluid compensation sensor a second instance that is subsequent the first instance. As described herein, the second particle data may be captured by the fluid composition sensor at a second instance, wherein the second instance occurs subsequent to the first instance in the midst of a sample collection operation being executed by the fluid composition sensor (e.g., the second particle data is captured at an instance that falls within the sample duration of the sample collection operation). For example, in various embodiments, the second plurality of particles received by the fluid composition sensor may be defined by the collective particles received at the collection media of the fluid composition sensor between the start of a sample collection operation and the second instance. Accordingly, as described herein, the second plurality of particles may be defined by the first plurality of particles (e.g., the plurality of particles received between the start of a sample collection operation and the first instance) and the additional plurality of particles (e.g., the plurality of particles received between the first instance and the second instance). In various embodiments, as described herein, second particle data associated with the second plurality of particles and captured by a fluid composition sensor may comprise a second particle image captured by an imaging device of the fluid composition sensor using one or more particle imaging techniques, such as, for example, lensless holography, fluorescent imaging, optical microscopy and/or the like.

Blocks 1022 and 1024 of the exemplary method 1000 correspond to various operations relating to the second particle data that are at least substantially similar to the steps previously described with respect to the first particle data at Blocks 1006 and 1008, respectively, including transmitting the second particle data to the external device and receiving second particle load data identifying a second particle load condition associated with the second particle data.

Further, Blocks 1026 and 1028 of the exemplary method 1000 correspond to various operations relating to a second optimal sample volume that are at least substantially similar to the steps previously described with respect to the first particle data at Blocks 1010 and 1012, respectively, including determining a second optimal sample volume associated with the sample collection operation based at least in part on the second particle load condition defined by the second plurality of particles captured at the collection media at the second instance, and based at least in part on the second optimal sample volume, updating the one or more operational characteristics of the fluid composition sensor such that the sample collection operation is defined at least in part by the second optimal sample volume.

In various embodiments, upon determining an optimal sample volume, an optimal sample duration, and/or the like at an instance during a sample collection operation, such a determined value may be compared to one or more operating characteristics associated with the sample collection operation. For example, in various embodiments, the exemplary method may comprise comparing an optimal sample volume determined based on the first particle data captured at the first instance, as described herein, to a total sampled volume associated with the sample collection operation at the first instance. As a further non-limiting example, the exemplary method may comprise comparing an optimal sample duration determined based on the first particle data captured at the first instance, as described herein, to a first elapsed time associated with the sample collection operation at the first instance. Further still, the exemplary method may comprise comparing a second optimal sample volume determined based on the second particle data captured at the second instance, as described herein, to a total sampled volume associated with the sample collection operation at the second instance. In various embodiments, upon determining that a determined optimal value, such as, for example, an optimal sample volume and/or an optimal sample duration, is at least substantially similar to an operational characteristic associated with the sample collection operation as measured at a present instance, the exemplary method may comprise stopping the sample collection operation.

For example, in various embodiments, as illustrated at Block 1030, exemplary method 1000 may further comprise stopping the sample collection operation upon determining that the second optimal sample volume is at least substantially equal to a total sampled volume received by the fluid composition sensor. In various embodiments, stopping the sample collection operation of a fluid composition sensor may comprise adjusting the operation of the fluid composition sensor, such as, for example, by causing one or more operational characteristics of the fluid composition sensor 100 (e.g., pump on/off configuration, pump volumetric flow rate, and/or the like) to be adjusted, so as to cause the fluid composition sensor to stop executing a sample collection operation (e.g., stop receiving a fluid sample). For example, one or more operational characteristics of the fluid composition sensor may be adjusted so as to reconfigure a pump/fan of the sensor to an "OFF" setting, thereby causing the fluid composition sensor to stop the sampling the fluid sample and defining and ending instance of the sample collection operation. As described herein, by stopping a sample collection operation at an identified optimal sample duration and/or after a fluid composition sensor has sampled an optimal sample volume, the sample collection operation may be stopped prior to the collection of a quantity of particles that deteriorates the accuracy of the measurements of future captured particles (e.g., because the collection media is sufficiently filled with particles that newly captured particles cannot be identified and/or edges of those particles cannot be accurately located). For example, as described herein, by stopping a sample collection operation at an identified optimal sample duration and/or after a fluid composition sensor has sampled an optimal sample volume, particle loading conditions resulting in increased inaccuracies caused by measurement errors arising from the physical saturation and/or deterioration of the collection media over time due to prolonged collection of a plurality of particles may be avoided. Additionally, or alternatively, in various embodiments, a sample collection operation may be stopped (e.g., by stopping operation of a pump of the fluid composition sensor) based on a determination that the optimal sample volume and/or an optimal sample duration associated with the sample collection operation has surpassed (e.g., is at least substantially greater than) a corresponding predetermined threshold, such as, for example, maximum sample collection operation duration threshold and/or a maximum sample collection operation volume threshold.

In various embodiments, an exemplary method as described herein may include repeating at least a portion of the steps described herein with respect to method 1000, such as, for example, the operations described in reference to Blocks 1002 through Block 1012, and/or the operations described in reference to Blocks 1018 through Block 1028, such that the method includes iteratively capturing a plurality of particle data at a plurality of sequential instances during a sample collection operation to facilitate a dynamic determination of an optimal sample volume (e.g., and/or optimal sample duration) made at least substantially in real-time for a particular sample collection operation. In various embodiments, upon determining that a determined optimal value associated with particle data captured at a particular instance during a sample collection operation, such as, for example, a second optimal sample volume and/or a second optimal sample duration determined based on second particle data associated with a second instance, is not at least substantially similar to a corresponding operational characteristic associated with the sample collection operation as measured at the particular instance, (e.g., the total sampled volume at the second instance and/or the second elapsed time at the second instance), the exemplary method may further continue with repeating one or more operations described herein, such as, for example, the operations described in reference to Blocks 1002 through Block 1012, in order to facilitate the iterative nature of the dynamic process of optimizing the total sampled volume of a sample collection operation based at least in part on real-time data captured by the fluid composition sensor.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A fluid sampling device, the fluid sampling device comprising:
 a fluid composition sensor configured to receive a fluid sample and capture a plurality of particles from the fluid sample at a collection media, wherein the fluid composition sensor is further configured to generate particle data associated with the plurality of particles using a particle imaging operation; and
 a controller, the controller being configured to:
  determine an optimal sample volume associated with a sample collection operation based at least in part on a particle load condition defined by the plurality of particles captured at the collection media during the sample collection operation;
  wherein the optimal sample volume is determined based at least in part on an elapsed sample time and a flow rate of the fluid composition sensor; and
  update one or more operational characteristics of the fluid composition sensor such that the sample collection operation is defined at least in part by the optimal sample volume.

2. The fluid sampling device of claim 1, wherein the controller is further configured to determine an updated sampling duration corresponding to the optimal sample volume; wherein updating the one or more operational characteristics of the fluid composition sensor such that the sample collection operation is defined at least in part by the optimal sample volume includes updating the one or more operational characteristics of the fluid composition sensor such that the sample collection operation is defined at least in part by the updated sampling duration.

3. The fluid sampling device of claim 2, wherein an optimal sample duration is determined based at least in part on the elapsed sample time as measured between a starting instance of the sample collection operation and an intermediate instance during the sample collection operation at which the particle data is generated by the fluid composition sensor.

4. The fluid sampling device of claim 1, wherein the particle data generated by the fluid composition sensor comprises a first particle image captured by an imaging device of the fluid composition sensor using lensless holography.

5. The fluid sampling device of claim 1, wherein the particle load condition comprises a particle coverage value defined by the plurality of particles captured at the collection media.

6. The fluid sampling device of claim 1, wherein the controller is further configured to transmit the particle data to an external device, and receive particle load data associated with the plurality of particles from the external device, wherein the particle load data received is defined at least in part by the particle load condition.

7. The fluid sampling device of claim 1, wherein the controller is further configured to, upon determining that the optimal sample volume is at least substantially equal to a total sampled volume received by the fluid composition sensor, cause the fluid composition sensor to stop the sample collection operation.

8. The fluid sampling device of claim 1, wherein the fluid composition sensor is configured to capture a plurality of particle data at each of a plurality of instances defined by set time intervals during the sample collection operation.

9. The fluid sampling device of claim 1, wherein the particle data generated by the fluid composition sensor comprises first particle data generated at a first instance during the sample collection operation and second particle data generated at a second instance during the sample collection operation, wherein the second instance is subsequent to the first instance; and wherein the controller is further configured to:
   determine a first optimal sample volume based at least in part on a first particle load condition defined by the plurality of particles captured at the collection media at the first instance; and
   determine a second optimal sample volume based at least in part on a second particle load condition defined by the plurality of particles captured at the collection media at the second instance.

10. The fluid sampling device of claim 9, wherein the controller is further configured to:
   upon determining the second optimal sample volume, further update the one or more operational characteristics of the fluid composition sensor such that the sample collection operation is defined at least in part by the second optimal sample volume.

11. A fluid sampling device, the fluid sampling device comprising:
   a fluid composition sensor configured to receive a fluid sample and capture a plurality of particles from the fluid sample at a collection media, wherein the fluid composition sensor is further configured to generate particle data associated with the plurality of particles using a particle imaging operation; and
   a controller, the controller being configured to:
   determine an optimal sample duration associated with a sample collection operation based at least in part on a particle load condition defined by the plurality of particles captured at the collection media during the sample collection operation;
   update one or more operational characteristics of the fluid composition sensor such that the sample collection operation is defined at least in part by the optimal sample duration; and
   stop the sample collection operation based on the optimal sample duration being at least substantially equal to a corresponding operational characteristic of the one or more operational characteristics associated with the sample collection operation.

12. A method for optimizing a sample collection operation comprising:
   receiving, via a volume of fluid, a fluid sample comprising a first plurality of particles;
   capturing, at a first instance during the sample collection operation, first particle data associated with the first plurality of particles received from within the fluid sample;
   determining an optimal sample characteristic associated with the sample collection operation based at least in part on a first particle load condition defined by the first plurality of particles;
   based at least in part on the optimal sample characteristic, updating one or more operational characteristics associated with the sample collection operation such that the sample collection operation is defined at least in part by the optimal sample characteristic; and
   upon determining that the optimal sample characteristic is at least substantially equal to a corresponding operational characteristic associated with the sample collection operation as measured at the first instance, stopping the sample collection operation.

13. The method of claim 12, wherein the optimal sample characteristic comprises an optimal sample volume.

14. The method of claim 12, wherein the optimal sample characteristic comprises an optimal sample duration.

15. The method of claim 12, wherein the fluid sample is received by a fluid composition sensor at a collection media; and wherein the first particle data is generated by the fluid composition sensor.

16. The method of claim 15, wherein the first particle data generated by the fluid composition sensor comprises a first particle image captured by an imaging device of the fluid composition sensor using lensless holography.

17. The method of claim 12, further comprising:
   capturing, at a second instance during the sample collection operation, second particle data associated with the first plurality of particles received from within the fluid sample, wherein the second instance is subsequent to the first instance; and
   determining a second optimal sample characteristic based at least in part on a second particle load condition identified based at least in part on the second particle data.

18. The method of claim 12, wherein the first particle load condition comprises a particle coverage value defined at least in part by the first plurality of particles.

* * * * *